US005790264A

United States Patent [19]

Sasaki et al.

[11] Patent Number: 5,790,264

[45] Date of Patent: Aug. 4, 1998

[54] INFORMATION REPRODUCTION APPARATUS

[75] Inventors: Hiroshi Sasaki, Hachioji; Takeshi Mori, Machida, both of Japan

[73] Assignee: Olympus Optical Co., Ltd., Tokyo, Japan

[21] Appl. No.: 666,633

[22] Filed: Jun. 18, 1996

[30] Foreign Application Priority Data

Jun. 23, 1995 [JP] Japan .................................... 7-157626

[51] Int. Cl.[6] ........................................ H04N 1/415

[52] U.S. Cl. ........................ 358/433; 395/154; 348/420

[58] Field of Search .................................. 395/153, 154; 358/433, 434, 426, 432, 443; 348/420, 423

[56] References Cited

U.S. PATENT DOCUMENTS

| | | | |
|---|---|---|---|
| 5,021,897 | 6/1991 | Yoshino et al. | 360/72.2 |
| 5,247,523 | 9/1993 | Arai et al. | 371/37.4 |

FOREIGN PATENT DOCUMENTS

| | | | |
|---|---|---|---|
| 0670555 A1 | 9/1995 | European Pat. Off. | G06K 1/12 |
| 5-165488 | 7/1993 | Japan . | |

*Primary Examiner*—Thomas D. Lee
*Assistant Examiner*—Jerome Grant, II
*Attorney, Agent, or Firm*—Frishauf, Holtz, Goodman, Langer & Chick

[57] ABSTRACT

A memory and a counter are used to count and store the number of times the same block address extracted by a block detection section is read. A scan speed calculation section calculates a scan speed on the basis of the number of times the same block address is read. A reproduction speed determination section determines a speech reproduction speed from this scan speed. A sampling frequency changing section generates a sampling frequency corresponding to the determined reproduction speed. A D/A converter D/A-converts speech data decoded by a decoding section at the reproduction sampling frequency. The converted data is filtered by a low-pass filter corresponding to the reproduction sampling frequency. The resultant data is output to a loudspeaker.

29 Claims, 18 Drawing Sheets

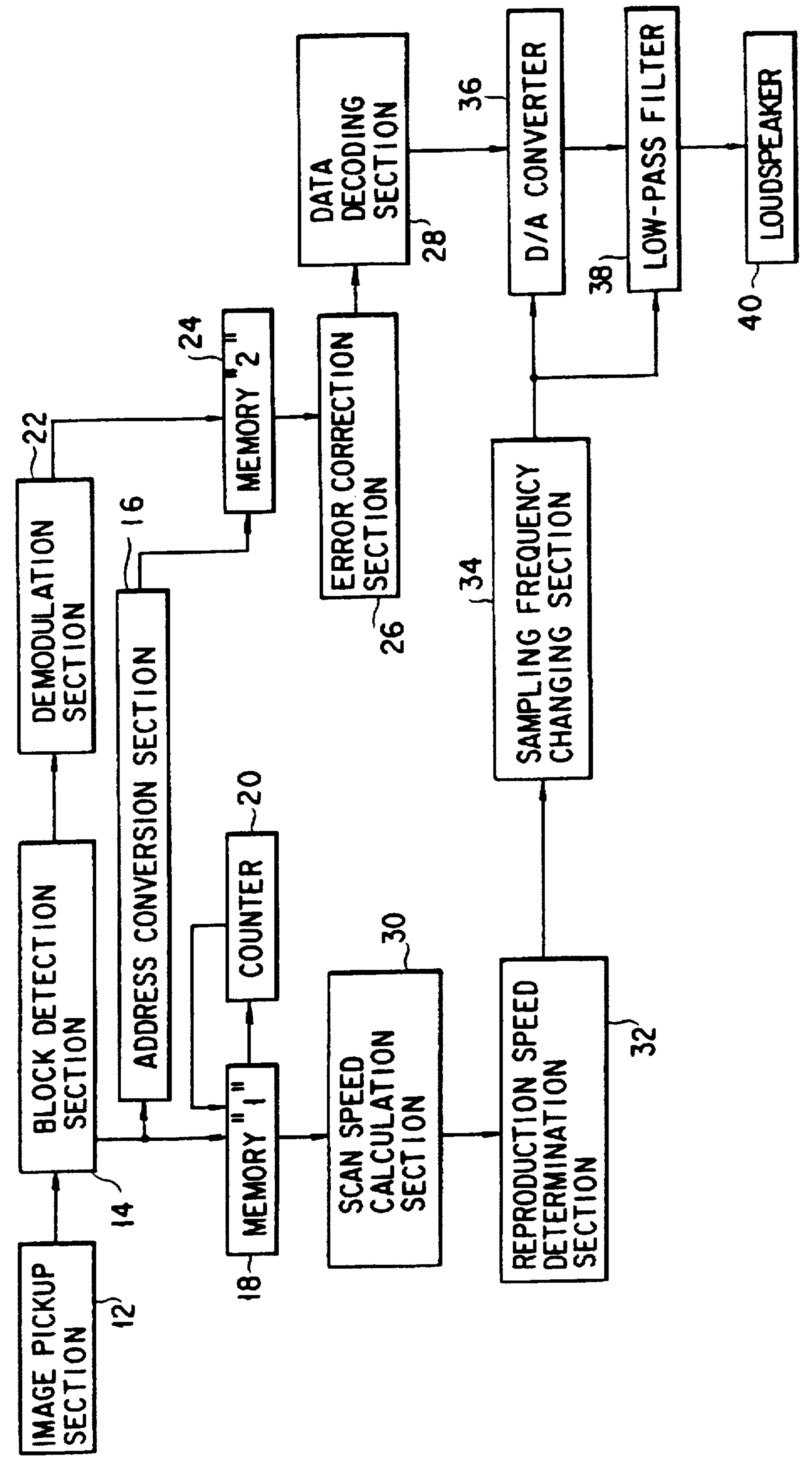
F I G. 1A

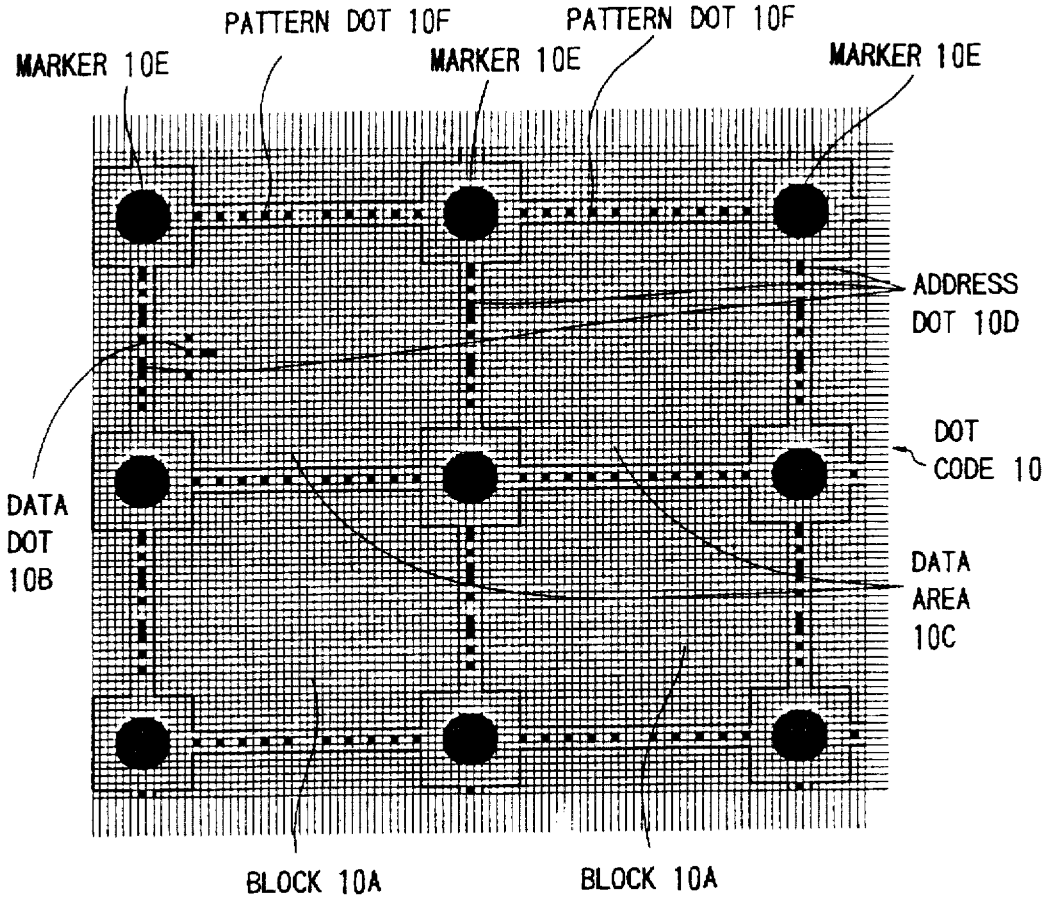
F I G. 2
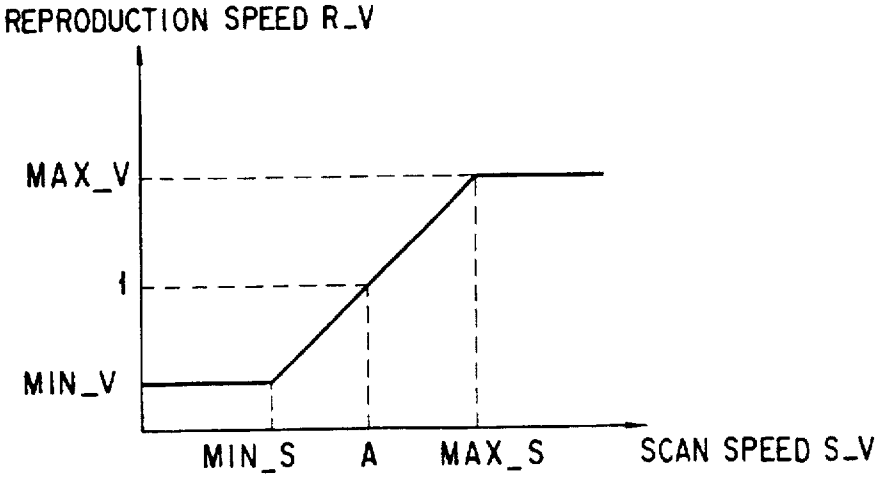
F I G. 12

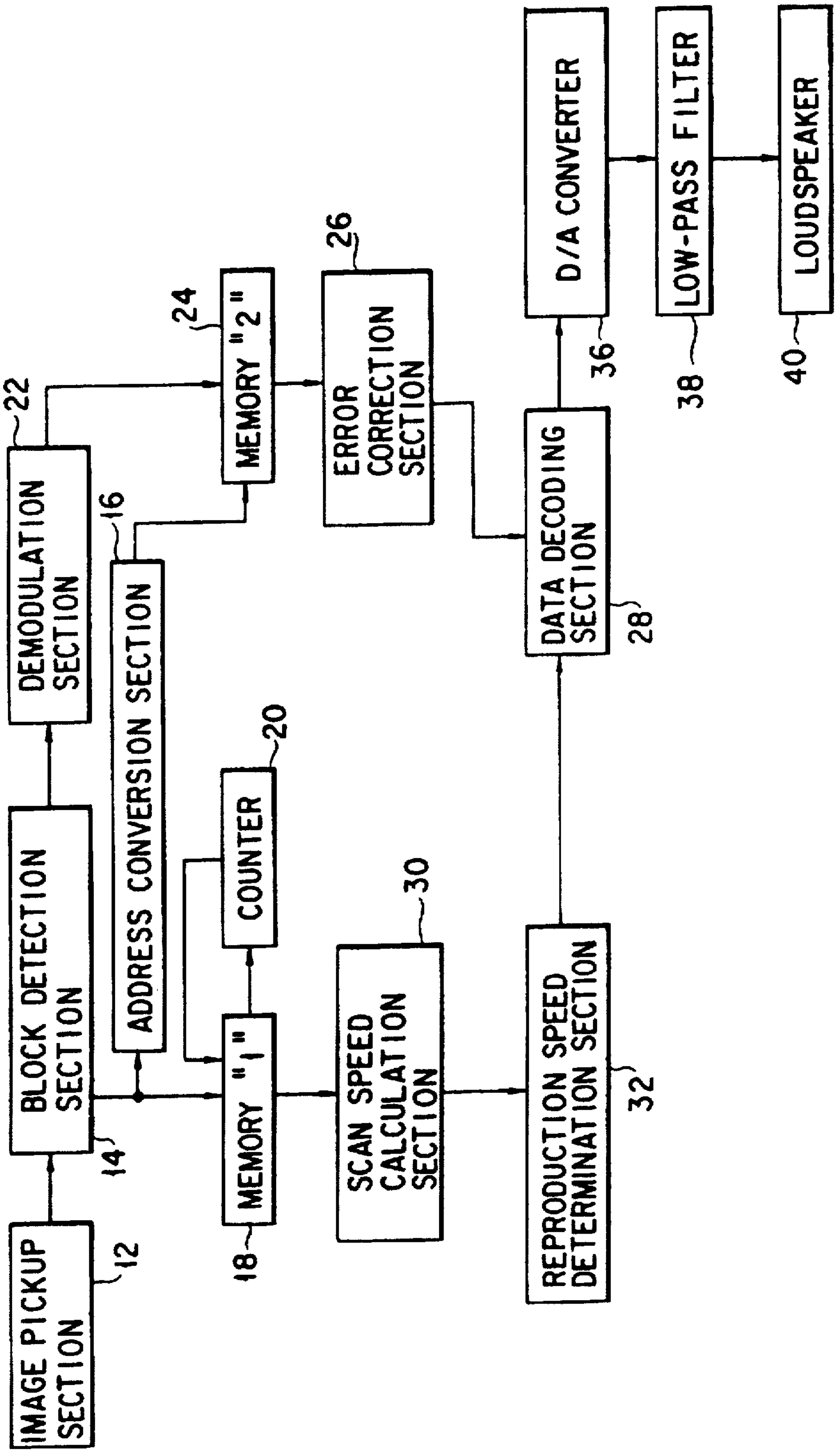
F I G. 4A

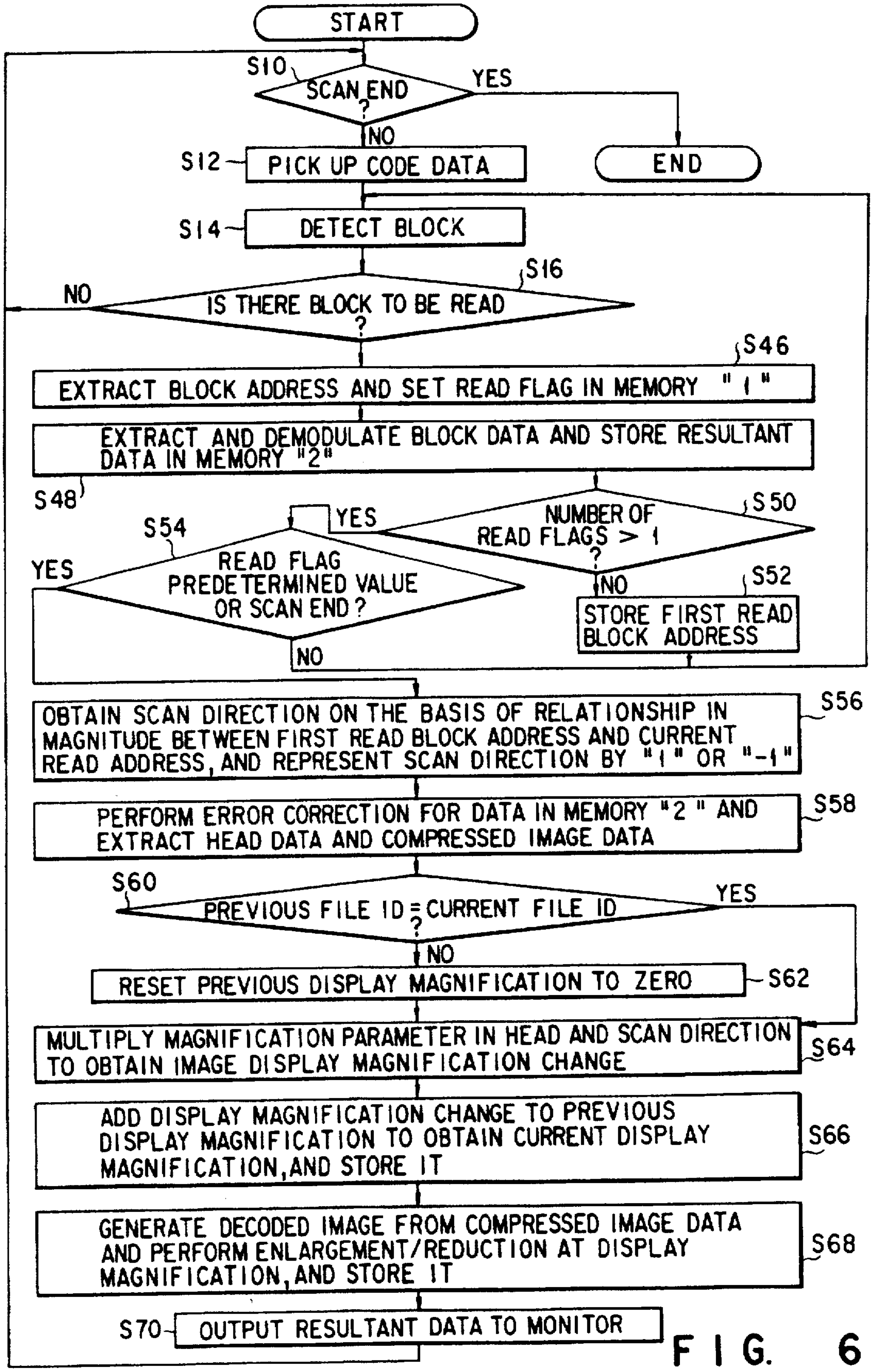
F I G. 6

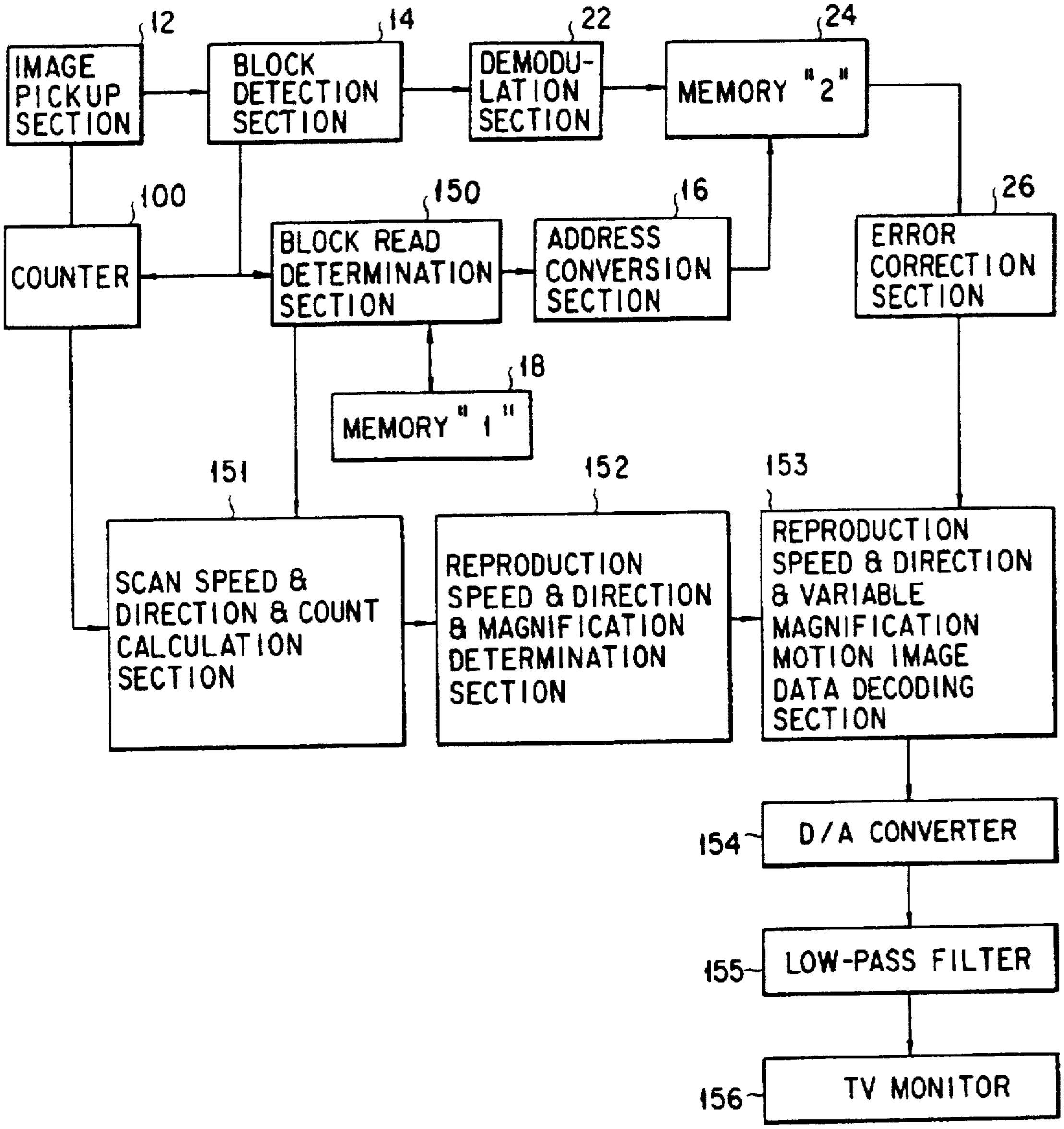
F I G. 9

$\boxed{c_{00}}$    F I G.   19A $\begin{bmatrix} c_{00} & c_{01} \\ c_{10} & c_{11} \end{bmatrix}$    F I G.   19B $\begin{bmatrix} c_{00} & c_{01} & c_{02} & c_{03} \\ c_{10} & c_{11} & c_{12} & c_{13} \\ c_{20} & c_{21} & c_{22} & c_{23} \\ c_{30} & c_{31} & c_{32} & c_{33} \end{bmatrix}$    F I G.   19C $\begin{bmatrix} c_{00} & c_{01} & c_{02} & c_{03} & c_{04} & c_{05} & c_{06} & c_{07} \\ c_{10} & c_{11} & c_{12} & c_{13} & c_{14} & c_{15} & c_{16} & c_{17} \\ c_{20} & c_{21} & c_{22} & c_{23} & c_{24} & c_{25} & c_{26} & c_{27} \\ c_{30} & c_{31} & c_{32} & c_{33} & c_{34} & c_{35} & c_{36} & c_{37} \\ c_{40} & c_{41} & c_{42} & c_{43} & c_{44} & c_{45} & c_{46} & c_{47} \\ c_{50} & c_{51} & c_{52} & c_{53} & c_{54} & c_{55} & c_{56} & c_{57} \\ c_{60} & c_{61} & c_{62} & c_{63} & c_{64} & c_{65} & c_{66} & c_{67} \\ c_{70} & c_{71} & c_{72} & c_{73} & c_{74} & c_{75} & c_{76} & c_{77} \end{bmatrix}$    F I G.   19D $\xleftarrow{\hspace{2cm} N \hspace{2cm}}$

| $c_{00}$ | $c_{01}$ | $c_{02}$ | $c_{03}$ | $c_{04}$ | $c_{05}$ | $c_{06}$ | $c_{07}$ | 0 | 0 | --- | 0 |
|---|---|---|---|---|---|---|---|---|---|---|---|
| $c_{10}$ | $c_{11}$ | $c_{12}$ | $c_{13}$ | $c_{14}$ | $c_{15}$ | $c_{16}$ | $c_{17}$ | 0 | 0 | --- | 0 |
| $c_{20}$ | $c_{21}$ | $c_{22}$ | $c_{23}$ | $c_{24}$ | $c_{25}$ | $c_{26}$ | $c_{27}$ | 0 | 0 | --- | 0 |
| $c_{30}$ | $c_{31}$ | $c_{32}$ | $c_{33}$ | $c_{34}$ | $c_{35}$ | $c_{36}$ | $c_{37}$ | 0 | 0 | --- | 0 |
| $c_{40}$ | $c_{41}$ | $c_{42}$ | $c_{43}$ | $c_{44}$ | $c_{45}$ | $c_{46}$ | $c_{47}$ | 0 | 0 | --- | 0 |
| $c_{50}$ | $c_{51}$ | $c_{52}$ | $c_{53}$ | $c_{54}$ | $c_{55}$ | $c_{56}$ | $c_{57}$ | 0 | 0 | --- | 0 |
| $c_{60}$ | $c_{61}$ | $c_{62}$ | $c_{63}$ | $c_{64}$ | $c_{65}$ | $c_{66}$ | $c_{67}$ | 0 | 0 | --- | 0 |
| $c_{70}$ | $c_{71}$ | $c_{72}$ | $c_{73}$ | $c_{74}$ | $c_{75}$ | $c_{76}$ | $c_{77}$ | 0 | 0 | --- | 0 |
| 0 | 0 | 0 | 0 | 0 | 0 | 0 | 0 | 0 | 0 | --- | 0 |
| 0 | 0 | 0 | 0 | 0 | 0 | 0 | 0 | 0 | 0 | --- | 0 |
| 0 | 0 | 0 | 0 | 0 | 0 | 0 | 0 | 0 | 0 | --- | 0 |

F I G.   19E

INFORMATION REPRODUCTION APPARATUS

BACKGROUND OF THE INVENTION

1. Field of the Invention

The present invention relates to an information reproduction apparatus for optically reading a code pattern, from an information recording medium such as paper, which is so-called multimedia information recorded as an optically readable code pattern, including, e.g., speech information such as speech and music information, image information obtained by a camera, video equipment, and the like, and text data obtained from a personal computer, a wordprocessor, and the like, and for reproducing the original multimedia information, and, more particularly, to special reproduction of multimedia information.

2. Description of the Related Art

As media for recording speech information such as speech and music information, a magnetic tape, an optical disk, and the like are conventionally known. However, even if copies of these media are produced in large quantities, the unit cost of production is relatively high, and storage of such copies requires a large space. In addition, when a medium on which speech information is recorded needs to be transferred to a person in a remote place, it takes much labor and time to mail or directly take the medium to the person. So-called multimedia information other than speech information, including image information obtained by a camera or video equipment, and text data obtained from a personal computer or wordprocessor has the same problems.

A system which can transmit multimedia information through a facsimile apparatus and records information in the form of dot codes as image information, i.e., coded information allowing production of copies in large quantities at a low cost, on an information recording medium such as paper, and a system for reproducing this information are disclosed as means for solving the above problems in EP 0670555A1 corresponded to U.S. application Ser. No. 08/407,018 assigned to the same assignee as the present invention.

FIG. 21 shows the arrangement of an information reproduction apparatus disclosed in this publication. This information reproduction apparatus comprises a detection section 184 for reading a dot code 170 from a sheet 182 on which the dot code 170 is printed, a scan conversion section 186 for recognizing image data supplied from the detection section 184 as a dot code and performing normalization, a binarization processing section 188 for binarizing multi-valued data, a demodulation section 190, a data error correction section 194 for correcting a read error or data error in reproduction, a data separation section 196 for separating data in accordance with their attributes, expansion processing sections provided in correspondence with data compression processing operations corresponding to the respective attributes, and a display or reproduction section, or another input device.

In the detection section 184, the dot code 170 on the sheet 182 is illuminated by a light source 198. The reflected light beam is detected as an image signal by an image pickup section 204 such as a CCD or CMD for converting optical information into an electrical signal through an imaging optical system 200 such as a lens and a spatial filter 202 for removing moire and the like, amplified by a preamplifier 206, and output. The light source 198, the imaging optical system 200, the spatial filter 202, the image pickup section 204, and the preamplifier 206 are arranged in an external light shielding section 208 for preventing a disturbance by external light. The image signal amplified by the preamplifier 206 is converted into digital information by an A/D converter 210 and the resultant information is supplied to the scan conversion section 186 at the subsequent stage.

The image pickup section 204 is controlled by an image pickup section controller 212. When, for example, an interline transfer type CCD is used as the image pickup section 204, the image pickup section controller 212 outputs, as control signals for the image pickup section 204, a V blanking signal for vertical synchronization, an image pickup element reset pulse signal for resetting information charges, a charge transfer gate pulse signal for sending charges accumulated in a two-dimensionally arranged charge transfer accumulation section to a plurality of vertical shift registers, a horizontal charge transfer clock signal serving as a transfer clock signal for a horizontal shift register for transferring charges in the horizontal direction and externally outputting the charges, a vertical charge transfer pulse signal for transferring the charges from the plurality of vertical shift registers in the vertical direction and sending the charges to the horizontal shift register, and the like.

The image pickup section controller 212 supplies a light-emitting cell control pulse for adjusting the timing of light emission of the light source 198 to the sheet in accordance with the timings of these signals.

The scan conversion section 186 is a section for recognizing image data supplied from the detection section 184 as a dot code, and normalizing it. As a technique for this operation, the image data from the detection section 184 is stored in an image memory 214, read out therefrom temporarily, and sent to a marker detection section 216. The marker detection section 216 detects a marker of each block. A data array direction detection section 218 detects the array direction of the data, i.e., the inclination, rotation, and direction of the data, by using the markers. In a block address detection & error determination & accurate center detection section 300, block addresses are detected, error determination is performed, and the correct, i.e., the true center, of each block is detected depending on whether a block address error is determined. In this case, the block address of a given block is detected in detecting its true center. For this reason, after interpolation between the marker and the block address is performed in a marker & block address interpolation section 302, the resultant block address information is supplied to an address control section 232 of a data memory section 234.

An address control section 220 performs address control on the basis of data obtained by block address interpolation processing and supplied from the marker & block address interpolation section 302, thereby performing address and write/read control with respect to the image memory 214. At this time, lens aberration information is read out from a correction memory 224 to correct the distortion in lens aberration of the imaging optical system 200 of the detection section 184 as well. The image data read out from the image memory 214 is supplied to an interpolation circuit 222. The interpolation circuit 222 performs interpolation processing of the image data to convert it to an original dot code pattern.

An output from the interpolation circuit 222 is supplied to the binarization processing section 188.

The dot code 170 is basically a black and white pattern, i.e., binary information. The data is therefore binarized by the binarization processing section 188. At this time, binarization is adaptively performed while threshold determination is performed by a threshold determination circuit 226 in consideration of the influences of disturbance, signal amplitude, and the like.

Since this dot code 170 has been modulated in a recording operation, the demodulation section 190 demodulates the data, and inputs the resultant data to the data memory section 234. At this time, the address control section 232 controls data write/read processing for the data memory section 234 in accordance with data from the marker & block address interpolation section 302. That is, the address control section 232 stores data in the data memory section 234 in units of blocks. By storing the data in units of block addresses in this manner, the data can be efficiently stored even if an intermediate data portion is omitted, or data starts from a halfway position.

After this operation, the data error correction section 194 performs error correction of the data read out from the data memory section 234. The output from the error correction section 194 is branched into two data. One data is sent as digital data to a personal computer, a wordprocessor, an electronic notebook, or the like. The other data is supplied to the data separation section 196 to be separated into image data, handwritten character or graph data, character or line drawing data, and sound data (original sound and sound obtained by speech synthesis).

Image data is multi-valued image data, which corresponds to a natural image. An expansion processing section 238 serving as a data decoding section performs expansion processing corresponding to JPEG used in compression processing. A data interpolation circuit 244 interpolates data in the reproduced data, for which error correction cannot be performed.

In an expansion processing section 242 serving as a data decoding section, expansion processing corresponding to MR/MH/MMR or the like used for compression is performed for binary image information such as handwritten character or graph information. In addition, a data interpolation circuit 244 performs interpolation of data for which error correction cannot be performed.

Character or line drawing data is converted into another pattern for display through a PDL (Page Description Language) processing section 246. In this case as well, of the character or line drawing data, data having undergone compression processing for a code after coding is subjected to expansion (e.g., Huffman or Ziv-Lempel) processing in an expansion processing section 248 serving as a data decoding section. The resultant data is then supplied to the PDL processing section 246.

The outputs from the data interpolation circuits 240 and 244 and the PDL processing section 246 are synthesized or selected by a synthesizing/switching circuit 250, and converted into an analog signal by a D/A converter 252. The corresponding information is then displayed on a display unit 254 such as a CRT (TV monitor) or an FMD (Face-Mounted Display). The FMD is a spectacle-like monitor (handy monitor) to be mounted on the face of a user. For example, this device is used for a virtual reality system and the like and can be effectively used to see a large screen in a small place.

Speech information is subjected to expansion processing corresponding to ADPCM in an expansion processing section 256 serving as a data decoding section. In performing speech synthesis, a speech synthesizing section 260 receives a code for speech synthesis and actually synthesizes and outputs speech using the code. In this case, if the code itself is compressed, speech synthesis is performed after expansion processing such as Huffman or Ziv-Lempel processing is performed by an expansion processing section 262 serving as a data decoding section, as in the case of the above character or line drawing data.

The outputs from a data interpolation circuit 258 and the speech synthesizing section 260 are synthesized or selected by a synthesizing/switching circuit 264, and converted into an analog signal by a D/A converter 266. The signal is then output to a speech output unit 268 such as a loudspeaker or headphone.

Character or line drawing data is directly output from the data separation section 196 to a page printer, a plotter or plotter 270. The character data is printed as a wordprocessor character on a paper sheet. The line drawing data is plotted as a drawing or the like.

Of the above pieces of multimedia information, for example, speech information used for an educational material (e.g., related to language) is sometimes required to be pronounced at a speed lower than a normal speed. On the contrary, fast reproduction of speech information is required in some applications.

In consideration of these points, a technique associated with a speech generator is disclosed in, e.g., Jpn. Pat. Appln. KOKAI Publication No. 5-165488. In this apparatus, speech data converted into a bar code is read by a bar code reader, and the read bar code is converted into speech and output at a speed corresponding to the speed of reading the bar code (read speed).

This technique is based on a bar code having a start code at the start portion, a speech code following the start code, a length code indicating the length of the bar code, and an end code at the end portion. The speed of reading the bar code is obtained from the read time determined by reading the start code and the stop code and the length data determined by reading the length code. The speech data is reproduced at a speed corresponding to this read speed.

In the reproduction apparatus disclosed in the EP 0670555A1 corresponded to U.S. application Ser. No. 08/1407,018, no consideration is given to special reproduction such as slow reproduction and fast reproduction of such speech information. That is, speech information is always output at a constant speed which doesn't depend on scan speed.

In some applications, special reproduction of image information, i.e., display of an image upon enlargement or reduction, is required. In the reproduction apparatus disclosed in the above publication, no consideration is given to such special reproduction either. That is, when a user wants to enlarge or reduce such image information, he/she must load the reproduced/output image information into a personal computer or the like to perform enlargement or reduction processing thereon.

In addition, since the technique disclosed in Jpn. Pat. Appln. KOKAI Publication No. 5-165488 is based on use of the above bar code, it is difficult to apply the technique to other code systems. If, therefore, the operator scans the bar code and cannot correctly detect the start code, the length code, and the end code, the speech data cannot be reproduced at a speed corresponding to the read speed. Furthermore, this technique allows only calculation of an average scan speed between the start code and the end code.

SUMMARY OF THE INVENTION

The present invention has been made in consideration of the above points, and has as its object to easily perform special reproduction (slow and fast reproduction) of speech information or special reproduction (enlargement and reduction) of image information by performing only a conventional manual scan operation without performing any new operation, allowing the present invention to be applied to a code system having an array of a plurality of blocks each having a fixed size but not having a start code, a stop code, and a length code, and allowing calculation of a scan speed even if only a local portion of a code is scanned.

According to an aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each block having a data code arranged in correspondence with the multimedia information, and an address code arranged at a predetermined position with respect to the data code in correspondence with an address of the block, and the read means includes reproducing operation control means for controlling a reproducing operation of the output means on the basis of a state of an address change based on an address code of a block read by the read means in a scan operation.

According to another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes count means for counting and storing the number of times the same block address is read by the read means, scan speed calculation means for calculating a scan speed of the read means on the basis of the number of times the same block is read, which is counted/memoried by the count means, reproduction speed determination means for determining a speech reproduction speed from the scan speed calculated by the scan speed calculation means, and speech output means for reproducing/outputting speech information, restored by the processing means, in accordance with the reproduction speed determined by the reproduction speed determination means.

According to still another aspect of the present invention, there is provided an information reproduction apparatus comprising read means for optically scanning and reading a code, as a two-dimensional image, from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, scan speech calculation means for calculating a scan speed from the number of images and the number of different detected block addresses which are counted by the first and second count means, reproduction speed determination means for determining a speech reproduction speed from the scan speed calculated by the scan speed calculation means, and speech output means for reproducing/outputting speech information, restored by the processing means, in accordance with the reproduction speed determined by the reproduction speed determination means.

According to still another aspect of the present invention, there is provided information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, reproduction direction determination means for determining a speech reproduction direction from the scan direction detected by the scan direction detection means, and speech direction output means for reproducing/outputting speech information, restored by the processing means, in accordance with the reproduction direction determined by the reproduction direction determination means.

According to still another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, scan count means for counting the number of times scan direction detection is performed by the scan direction detection means, and setting the counted number of times as the number of times the same code is scanned, reproduction volume determination means for determining a speech reproduction volume on the basis of the scan direction detected by the scan direction detection means and the number of times the same code is scanned, which is detected by the scan count means, and speech output means for reproducing/outputting speech information, restored by the processing means, in accordance with the reproduction volume determined by the reproduction volume determination means.

According to still another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, count output control means for performing control to output count values from the first and second count means when no block address can be detected by the read means, block address storage means for storing a plurality of block addresses detected by the read means at predetermined time intervals, scan speed calculation means for calculating a scan speed on the basis of the number of images and the number of different detected block addresses which are respectively counted by the first and second count means whose outputs are controlled by the count output control means, third count means for counting the number of output count values controlled by the count output control means, scan count calculation means for calculating the number of times scan is performed on the basis of a count value obtained by the third count means, scan direction detection means for detecting a scan direction from the plurality of block addresses, reproduction speed determination means for determining a speech reproduction speed from the scan speed calculated by the scan speed calculation means, reproduction direction determination means for determining a speech reproduction direction from the scan direction detected by the scan direction detection means, reproduction volume determination means for determining a speech reproduction volume on the basis of the number of times scan is performed, which is calculated by the scan count calculation means, and the scan direction calculated by the scan direction calculation means, speech restoration means for restoring speech information from the reproduction volume determined by the reproduction volume determination means, and speech output means for reproducing/outputting the speech information in accordance with the reproduction speed determined by the reproduction speed determination means and the reproduction direction determined by the reproduction direction determination means.

According to still another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes count means for counting and storing the number of times the same block address is read by the read means, scan speed calculation means for calculating a scan speed of the read means on the basis that the number of times of the same block address is read, which is counted/memoried by the count means, reproduction speed determination means for determining a motion image reproduction speed from the scan speed calculated by the scan speed calculation means, and motion image output means for reproducing/outputting motion image information, restored by the processing means, in accordance with the reproduction speed determined by the reproduction speed determination means.

According to still another aspect of the present invention, there is provided an information reproduction apparatus comprising read means for optically scanning and reading a code, as a two-dimensional image, from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, scan speech calculation means for calculating a scan speed from the number of images and the number of different detected block addresses which are counted by the first and second count means, reproduction speed determination means for determining a motion image reproduction speed from the scan speed calculated by the scan speed calculation means, and motion image output means for reproducing/outputting motion image information, restored by the processing means, in accordance with the reproduction speed determined by the reproduction speed determination means.

According to still another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, reproduction direction determination means for determining a motion image reproduction direction from the scan direction detected by the scan direction detection means, and motion image output means for reproducing/outputting motion image information, restored by the processing means, in accordance with the reproduction direction determined by the reproduction direction determination means.

According to still another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, scan count means for counting the number of times scan direction detection is performed by the scan direction detection means, and setting the counted number of times as the number of times the same code is scanned, reproduction magnification determination means for determining a motion image reproduction magnification on the basis of the scan direction detected by the scan direction detection means and the number of times the same code is scanned, which is detected by the scan count means, and motion image output means for reproducing/outputting motion image information, restored by the processing means, in accordance with the reproduction magnification determined by the reproduction magnification determination means.

According to still another aspect of the present invention, there is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, count output control means for performing control to output count values from the first and second count means when no block address can be detected by the read means, block address storage means for storing a plurality of block addresses detected by the read means at predetermined time intervals, scan speed calculation means for calculating a scan speed on the basis of the number of images and the number of different detected block addresses which are respectively counted by the first and second count means whose outputs are controlled by the count output control means, third count means for counting the number of output count values controlled by the count output control means, scan count calculation means for calculating the number of times scan is performed on the basis of a count value obtained by the third count means, scan direction detection means for detecting a scan direction from the plurality of block addresses, reproduction speed determination means for determining a motion image reproduction speed from the scan speed detected by the scan speed detection means, reproduction direction determination means for determining a motion image reproduction direction from the scan direction calculated by the scan direction calculation means, reproduction magnification determination means for determining a motion image reproduction magnification on the basis of the number of times scan is performed, which is calculated by the scan count calculation means, and the scan direction detected by the scan detection calculation means, motion image restoration means for restoring motion image information from the reproduction magnification determined by the reproduction magnification determination means, and motion image output means for reproducing/outputting the motion image information in accordance with the reproduction speed determined by the reproduction speed determination means and the reproduction direction determined by the reproduction direction determination means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a block diagram showing the arrangement of an information reproduction apparatus according to the first embodiment of the present invention.

FIG. 2 is a view showing the format of a dot code;

FIG. 4A is a block diagram showing the arrangement of an information reproduction apparatus according to the second embodiment of the present invention.

FIG. 6 is a flow chart showing the operation of the third embodiment;

FIG. 9 is a block diagram showing the arrangement of an information reproduction apparatus according to the sixth embodiment of the present invention;

FIG. 12 is a graph showing the relationship between the scan speed and the reproduction speed;

FIG. 19A is a view showing a DCT coefficient for a magnification of ⅛, FIG. 19B is a view showing DCT coefficients for a magnification of ¼, FIG. 19C is a view showing DCT coefficients for a magnification of ½, FIG. 19D is a view showing DCT coefficients for a standard magnification, and FIG. 19E is a view showing DCT coefficients for a magnification of N/8;

DETAILED DESCRIPTION OF THE PREFERRED EMBODIMENTS

Figure 1B:
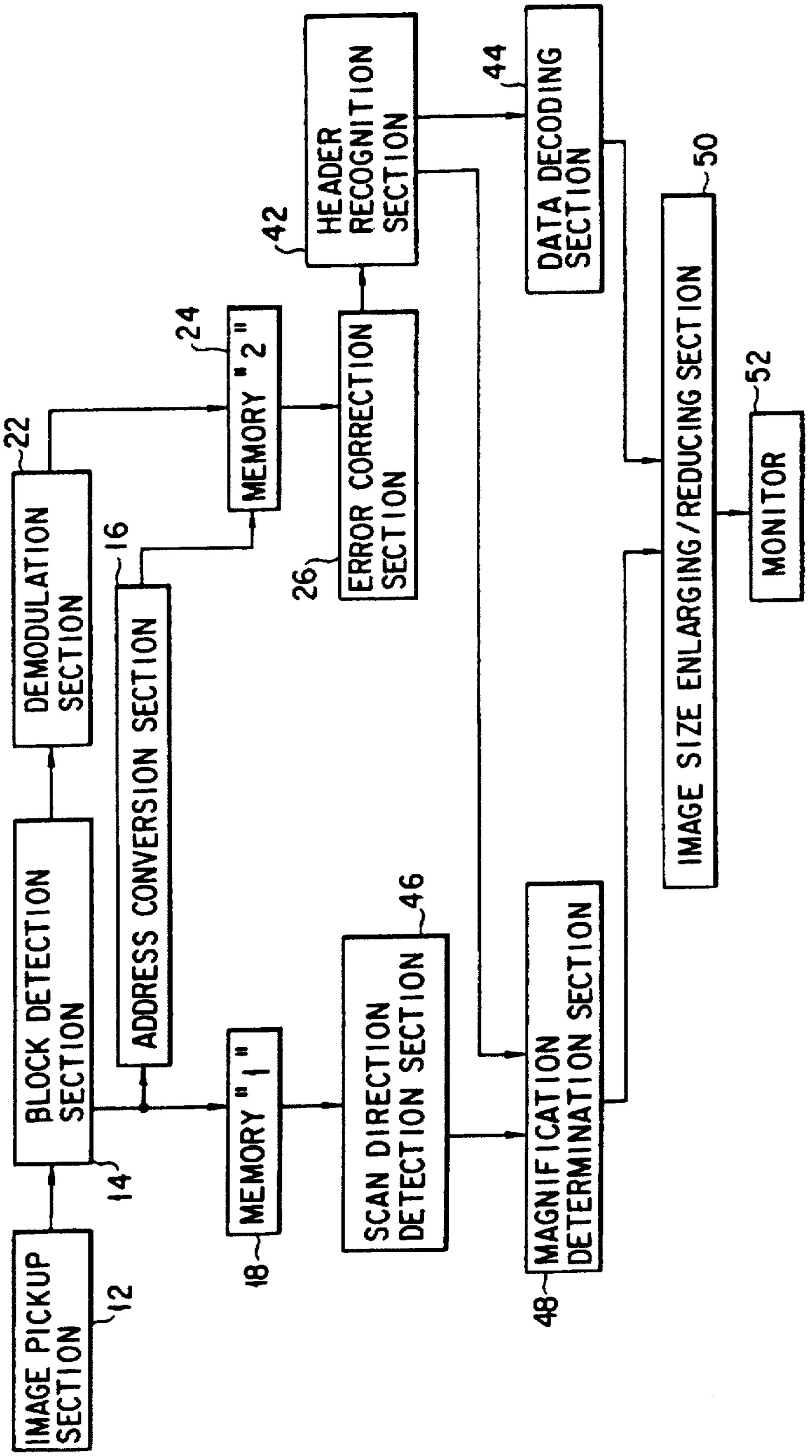
FIG. 1B is a block diagram showing the arrangement of an information reproduction apparatus according to the third embodiment of the present invention.

The first to sixth embodiments of the present invention will be described below with reference to the accompanying drawings.

Each of the following embodiments uses a dot code 10 like the one shown in FIG. 2, which is obtained by converting multimedia information including at least one of speech information, image information, and text data into an optically readable code. More specifically, the dot code 10 is constituted by a block group consisting of a plurality of blocks 10A arranged in the form of a matrix. Each block has data dots in a predetermined unit. Each block 10A includes a data area 10C in which a plurality of data dots are arranged in accordance with the contents of information, and block address dots 10D which are arranged in accordance with a predetermined positional relationship with the data area 10C and indicate the address of the block. Each block 10A also includes markers 10E arranged at predetermined positions, e.g., four corners, and predetermined matching pattern dots 1OF arranged at a predetermined position with respect to the markers 10E, e.g., between markers adjacent to each other in the first direction. Note that the block address dots 10D are arranged at a predetermined position with respect to the markers 10E, e.g., between markers adjacent to each other in the second direction. The matching pattern dots 10F, the block address dots 10D, and the data dots 10B arranged in the data area 10C are constituted by dots having the same size. Each marker 10E is constituted by a dot larger than these dots. For example, a circular dot having a diameter corresponding to seven data dots is recorded as each marker 10E on a recording medium.

After calculating the position of the code from the detected image, the data dots 10B are read. Data dots 10B are read on the basis of basic coordinate which is calculated by a way described below.

For calculating the coordinate of markers correctly, the pattern dots 1OF located between the markers is searched, and the center of gravity of the detected pattern dots 10F is calculated, and the coordinates of markers 10E is calculated correctly, and lastly the code is read on the basis of the coordinates. This way is disclosed in Jpn. Pat. Appln. KOKAI Publication No. 6-313698 filed by the applicant of the present invention.

In the first embodiment, speech information is recorded as the dot code 10.

FIG. 1A shows the arrangement of the first embodiment. An image pickup section 12 picks up the dot code 10 while the dot code 10 on the recording medium is manually scanned with the information recording apparatus. For example, the image pickup section 12 corresponds to the detection section 184 in FIG. 21. A block detection section 14 corresponds to the scan conversion section 186 in FIG. 21. The block detection section 14 detects the markers 10E and the blocks 10A (block addresses) from the image data obtained by the image pickup section 12. Block address data output from the block detection section 14 is supplied to an address conversion section 16 corresponding to the address control section 232 in FIG. 21, and is also supplied as a read/write address to a memory "1" 18.

Data at an address corresponding to the block address supplied from the block detection section 14 is read out from the memory "1" 18. After the data is incremented by a counter 20 by one, the value of the counter 20 is written at the corresponding address again. That is, the data in the memory "1" 18 is incremented by one, and the resultant data is stored at the same position, thereby indicating the number of times the block address is read.

Figure 21:
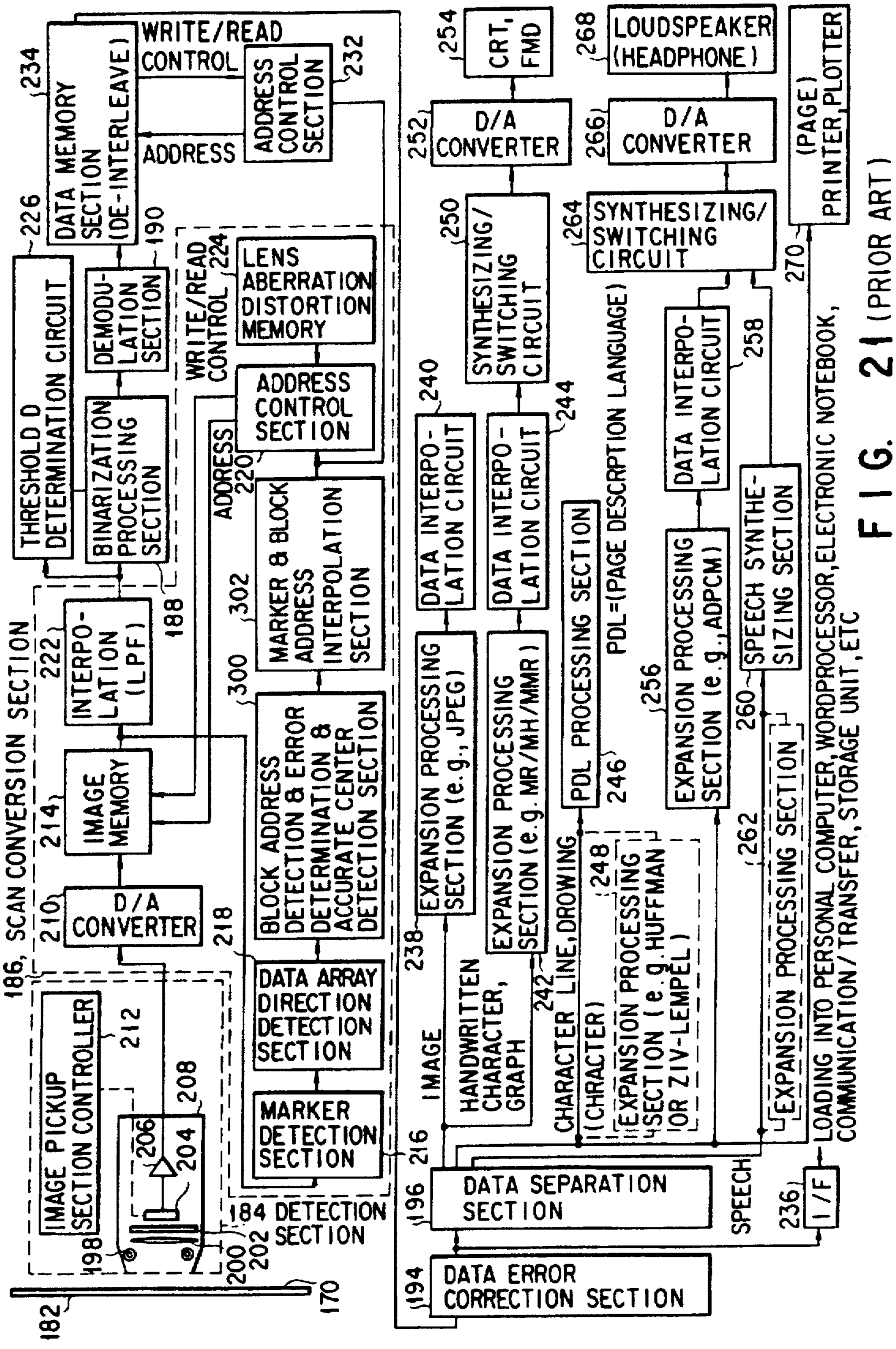
FIG. 21 is a block diagram showing the arrangement of a conventional information reproduction apparatus.

The data in the block output from the block detection section 14 is input to a demodulation section 22 corresponding to the demodulation section 190 in FIG. 21 and demodulated. The resultant data is supplied to a memory "2" 24. The block address is converted into an address for the memory "2" 24 by the address conversion section 16. This address has been supplied to the memory "2" 24. The demodulated data is stored at this memory address. The data stored in the memory "2" 24 in this manner are sequentially read out to be subjected to error correction in an error correction section 26 corresponding to the error correction section 194 in FIG. 21. The resultant data is subjected to data decoding processing, i.e., speech decoding processing, in a data decoding section 28 corresponding to the expansion processing section 256 in FIG. 21.

When the above error correction is performed, a scan speed calculation section 30 reads out the data stored in the memory "1" 18, i.e., the data indicating the number of read identical block addresses, and calculates the maximum or average value of all the data stored in the memory "1" 18. A table corresponding to this maximum or average value is prepared in a reproduction speed determination section 32. The reproduction speed determination section 32 determines a reproduction speed in accordance with this table. A sampling frequency changing section 34 changes a sampling frequency in accordance with the data representing the reproduction speed determined by the reproduction speed determination section 32.

A D/A converter 36 D/A-converts the speech data, decoded by the data decoding section 28, at this sampling frequency. The resultant analog speech signal is filtered by a low-pass filter 38 corresponding to the above sampling frequency. The resultant data is then output as speech from a loudspeaker 40 corresponding to the speech output unit 268 in FIG. 21.

Figure 3:
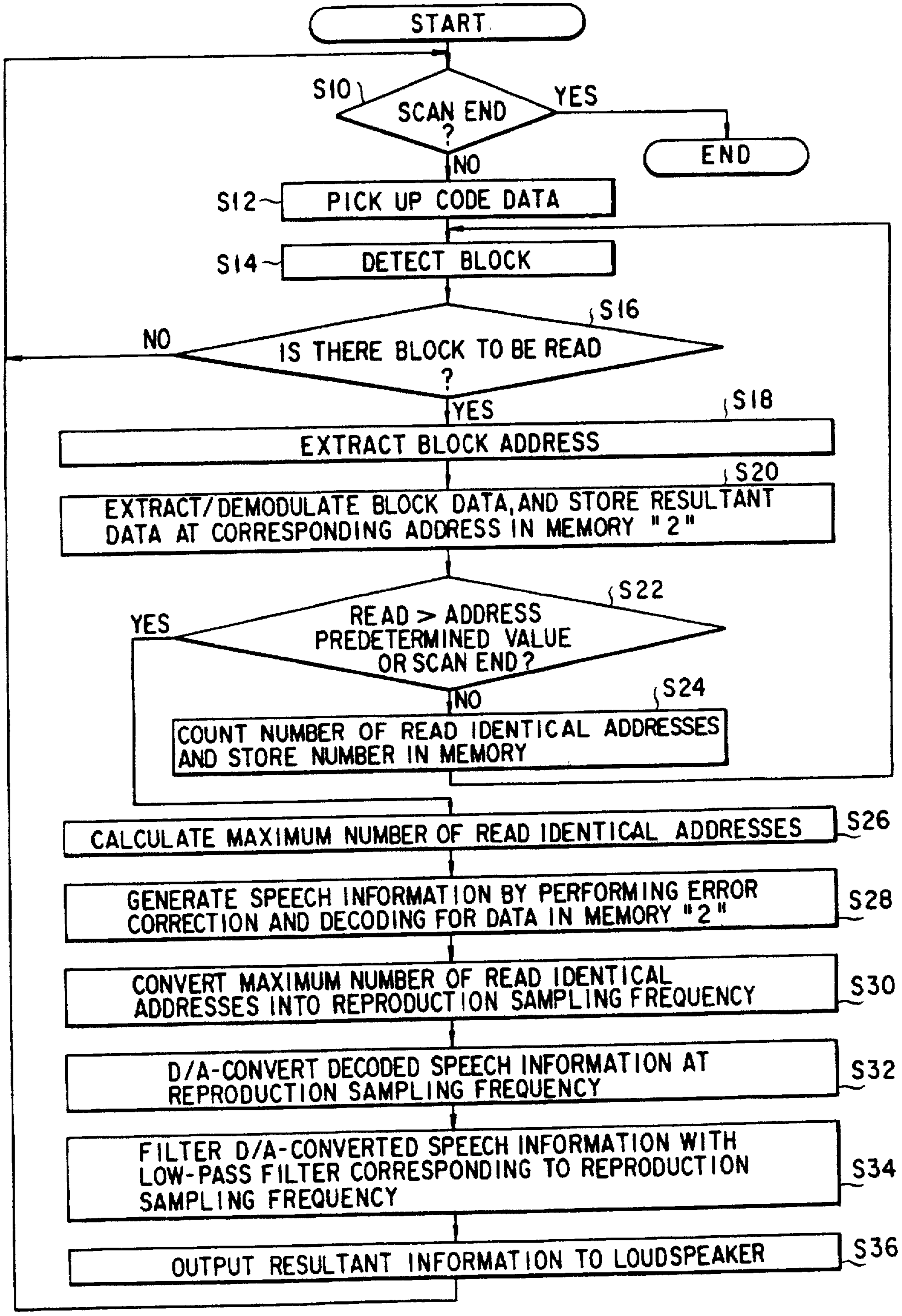
FIG. 3 is a flow chart showing the operation of the first embodiment.

An operation in this arrangement will be described below with reference to the flow chart of FIG. 3. First of all, it is checked whether processing has come to a scan end (step S10). For example, the state of processing can be determined on the basis of the state of a scan button which can be depressed by the operator to indicate that the dot code 10 is being manually scanned.

If the processing has not come to an end, the dot code 10 as code data is picked up by the image pickup section 12 (step S12). The block detection section 14 performs block detection (step S14). It is then checked whether there is a block to be read (step S16).

If there is no block to be read, the flow returns to step S10. If there is a block to be read, the block detection section 14 further extracts a block address (step S18). Block data is also extracted and demodulated. The resultant data is stored in the memory "2" 24 (step S20).

It is checked whether the number of block addresses which have been read exceeds a predetermined number (or scan end) (step S22). If NO in step S22, the counter 20 counts the number of read identical addresses, and the count value is stored in the memory "1" 18 (step S24). Thereafter, the flow returns to step S14 to perform block detection again.

When a certain number, i.e., a predetermined number, of block addresses are read in this manner, the scan speed calculation section 30 calculates the maximum number (or average value) of the numbers of read identical addresses (step S26).

The error correction section 26 performs error correction for the data in the memory "2" 24, and the data decoding section 28 performs decoding processing, thereby generating speech data (step S28).

The reproduction speed determination section 32 converts the maximum (or average) number of read identical addresses, calculated by the scan speed calculation section 30, into a reproduction sampling frequency (step S30). The sampling frequency changing section 34 generates the sampling frequency, and the speech data decoded by the data decoding section 28 is D/A-converted at this reproduction sampling frequency (step S32). Thereafter, the speech signal having undergone this D/A conversion is filtered by the low-pass filter 38 corresponding to the above reproduction sampling frequency (step S34), and the resultant data is output to the loudspeaker 40 (step S36).

After this operation, the flow returns to step S10 to check whether the processing has come to a scan end.

In processing speech information, when a scan operation progresses to a certain degree, the read information can be sequentially reproduced and output instead of processing speech information after one scan operation is completed.

When the depressed state of the scan button is canceled, it is determined that one scan operation is completed, and the processing in this flow chart is terminated.

As described above, according to the first embodiment, the speed of scanning the dot code 10 (scan speed) is detected, and the speech reproduction speed is changed in accordance with the scan speed. That is, if the dot code 10 is manually scanned at a low speed, speech is slowly reproduced and output.

The second embodiment of the present invention will be described next.

In this embodiment, a speech reproduction speed can be changed in accordance with a scan speed as in the first embodiment without using the sampling frequency changing section 34 in the first embodiment.

FIG. 4A shows the arrangement of the second embodiment. The same reference numerals in FIG. 4A denote the same parts as in FIG. 1A. In the first embodiment, an output from the reproduction speed determination section 32 is input to the sampling frequency changing section 34. In the second embodiment, however, this output is supplied to a data decoding section 28, and the sampling frequency of a D/A converter 36 and the type of a low-pass filter 38 are fixed.

The data decoding section 28 decodes compressed data having undergone error correction processing in an error correction section 26 in accordance with a reproduction speed determined by a reproduction speed determination section 32. For example, when a dot code is scanned at a low speed, speech data corresponding to a speed ½ the normal reproduction speed is generated to generate speech data for slow reproduction. For example, this slow reproduction data can be realized by repeating 40-msec speech or converting the speech information into 80-msec speech, i.e., speech having a double frequency. In contrast to this, if a dot code is scanned at a high speed, the data decoding section 28 generates speech data corresponding to a speed twice the normal reproduction speed.

Figure 5:
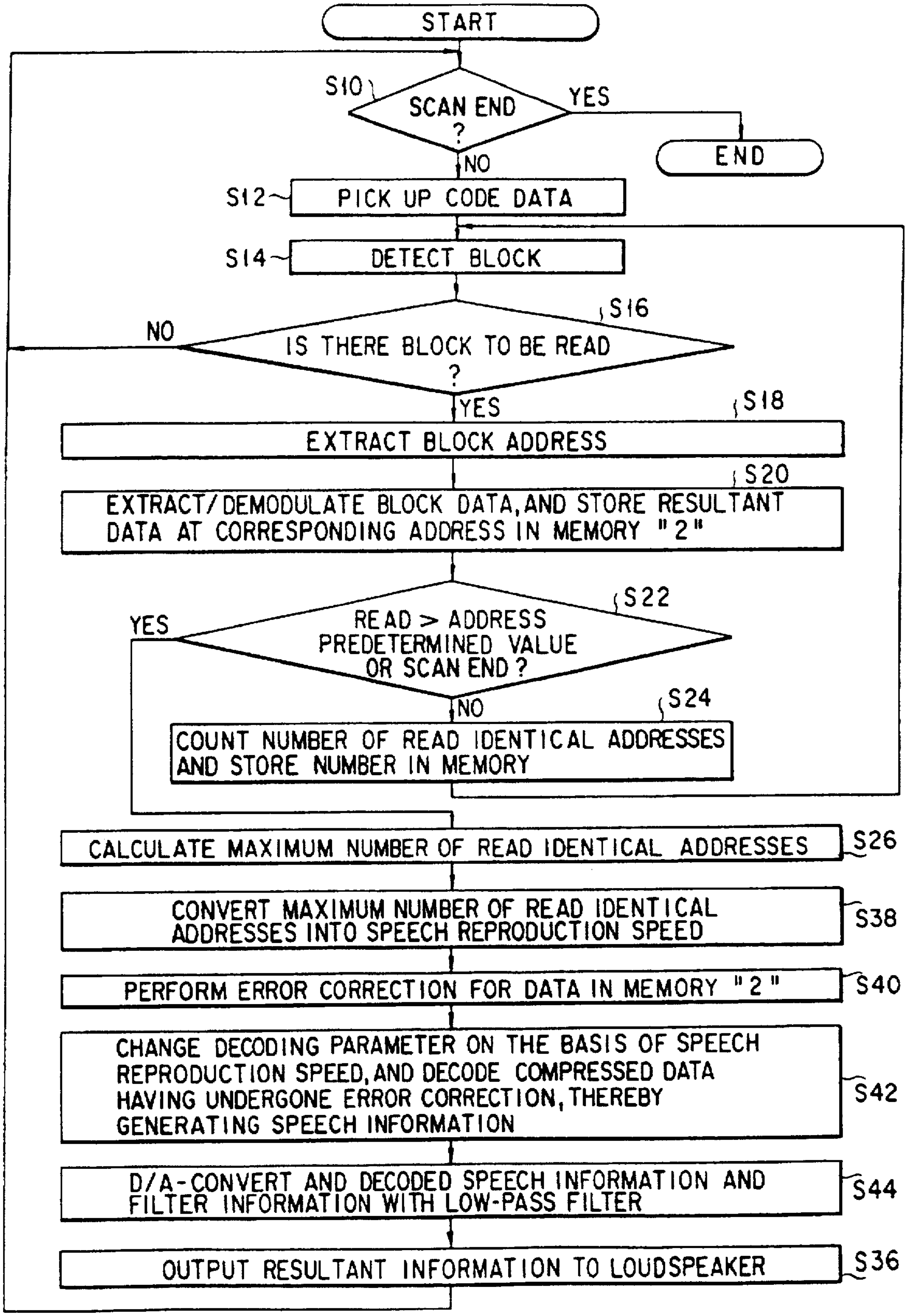
FIG. 5 is a flow chart showing the operation of the second embodiment.

FIG. 5 is a flow chart showing an operation in this case. The same reference symbols in FIG. 5 denote the same processing as in the flow chart of FIG. 3. That is, in this embodiment, after the maximum number of read identical addresses is calculated in step S26, the calculated number is converted into a speech reproduction speed by the reproduction speed determination section 32 (step S38).

The error correction section 26 performs error correction for the data in a memory "2" 24 (step S40). The data decoding section 28 changes decoding parameters on the basis of the speech reproduction speed determined by the reproduction speed determination section 32, and decodes the compressed data having undergone the above correction processing to generate speech information (step S42).

This decoded speech information is D/A-converted by the D/A converter 36 and filtered by the low-pass filter 38 (step S44). The resultant information is output to a loudspeaker 40 (step S36).

In the first and second embodiments, a mode switch or the like may be used to select normal reproduction or special reproduction. Alternatively, different thresholds may be set to automatically switch the modes in such a manner that normal reproduction is performed within a certain speed range, and special reproduction is performed outside this speed range.

The third embodiment will be described next, in which image information is recorded as the dot code 10.

FIG. 1B shows the arrangement of the third embodiment. An image pickup section 12 picks up the dot code 10 while the dot code 10 on the recording medium is manually scanned with the information reproduction apparatus. A block detection section 14 detects the markers 10E and the blocks 10A (block addresses) from the image data obtained by the image pickup section 12. Block address data output from the block detection section 14 is supplied to an address conversion section 16, and is also supplied as a write address to a memory "1" 18. A read flag is then set at the address in the memory "1" 18.

The data in the block output from the block detection section 14 is input to a demodulation section 22 and demodulated. The resultant data is supplied to a memory "2" 24. The block address is converted into an address for the memory "2" 24 by the address conversion section 16. This address has been supplied to the memory "2" 24. The demodulated data is stored at this memory address.

The data stored in the memory "2" 24 in this manner are sequentially read out to be subjected to error correction in an error correction section 26. The resultant data is input to a header recognition section 42 corresponding to the data separation section 196 in FIG. 21. The header recognition section 42 recognizes the header of the data having undergone error correction, and separates the header data from the actual compressed image data. The compressed image data is sent to a data decoding section 44 to be subjected to decoding processing such as JPEG (Joint Photographic Coding Experts Group).

A scan direction detection section 46 stores the address at which the read flag is set for the first time in the memory "1" 18 (to be referred to as the first read block address hereinafter). After a predetermined number of blocks are read, i.e., a predetermined period of time elapses, e.g., when one scan operation is completed, the scan direction detection section 46 compares the first read block address with an address at which a current flag is set in the memory "1" 18 (to be referred to as the current read block address hereinafter) to detect a scan direction. More specifically, if the current read block address is larger than the first read block address, it can be determined that a scan operation has been performed in the forward direction. In contrast to this, if the current read block address is smaller than the first read block address, it can be determined that a scan operation has been performed in the reverse direction. If a scan direction is the forward direction, "+1" is supplied as information indicating the scan direction to the magnification determination section 48. Similarly, if a scan direction is the reverse direction, "−1" is supplied.

The header data has been supplied from the header recognition section 42 to a magnification determination section 48. This header data includes, for example, the file ID of the dot code, an image display magnification parameter, and the like. The magnification determination section 48 checks on the basis of the file ID whether the currently read dot code is identical to the previously read dot code. If they are identical to each other, the magnification determination section 48 determines a magnification change on the basis of the scan direction detected by the scan direction detection section 46. More specifically, if the scan direction is the forward direction, the above magnification parameter is multiplied by "+1". If the scan direction is the reverse direction, the parameter is multiplied by "−1". The result is set as a magnification change. This magnification change is then added to the previous display magnification. The resultant data is supplied as a current display magnification to an image size enlarging/reducing section 50. If the currently read dot code is different from the previously read dot code, the previous display magnification is reset to zero. Thereafter, a magnification change is obtained in the same manner as described above to determine a display magnification. The determined display magnification is then supplied to the image size enlarging/reducing section 50.

The image size enlarging/reducing section 50 enlarges or reduces the image, decoded by the data decoding section 44, at the display magnification supplied from the magnification determination section 48, and displays/outputs the resultant image on a monitor 52.

An operation in this arrangement will be described below with reference to the flow chart of FIG. 6.

First of all, it is checked whether processing has come to a scan end (step S10). For example, the state of processing can be determined on the basis of the state of a scan button which can be depressed by the operator to indicate that the dot code 10 is being manually scanned.

If the processing has not come to an end, the dot code 10 as code data is picked up by the image pickup section 12 (step S12). The block detection section 14 performs block detection (step S14). It is then checked whether there is a block to be read (step S16).

If there is no block to be read, the flow returns to step S10. If there is a block to be read, the block detection section 14 further extracts a block address, and a read flag is set in the memory "1" 18 (step S46). Block data is extracted and demodulated, and the resultant data is stored in the memory "2" 24 (step S48).

The magnification determination section 48 checks whether the number of read flags in the memory "1" 18 is larger than "1" (step S50). If the number of read flags is "1", i.e., the first read operation is performed, the first read block address is stored (step S52). Thereafter, the flow returns to step S14 to detect the next block.

When the next block is processed, it is determined in step S50 that the number of read flags is larger than "1". In this case, the magnification determination section 46 further checks whether the number of read flags exceeds a predetermined number or scan end (step S54). If NO in step S54, the flow returns to step S14 to detect the next block.

If it is determined in step S54 that the number of read flags exceeds the predetermined number, a scan direction is obtained on the basis of the relationship in magnitude between the first read block address and the current read block address, i.e., the read block address set when the number of read flags exceeds the predetermined number. In this case, the scan direction is represented by "1" or "−1" (step S56).

After this operation, the error correction section 26 performs error correction for the data in the memory "2" 24, and the header recognition section 42 extracts header data and compressed image data (step S58). The magnification determination section 48 checks whether the file ID in the header data is identical to the previous file ID (step S60). If YES in step S60, the flow advances to step S64. If NO in step S60, the previous display magnification is reset to "0" (step S62). Thereafter, the magnification parameter in the header data and the scan direction determined by the magnification determination section 48 are multiplied to obtain an image display magnification change (step S64). This display magnification change is added to the previous display magnification to obtain a current display magnification, and the obtained magnification is stored (step S66).

After the data decoding section 44 generates a decoded image from the compressed image data, the image size enlarging/reducing section 50 enlarges or reduces the image at the above display magnification (step S68), and outputs the resultant data to the monitor 52 (step S70).

After this operation, the flow returns to step S10 to check whether the processing has come to a scan end.

If the depressed state of the scan button is canceled, it is determined that one scan operation is completed, and the processing in this flow chart is terminated.

As described above, according to the third embodiment, the scan direction of the dot code 10 is detected, and the information is enlarged/displayed or reduced/displayed in accordance with this scan direction. That is, as a scan operation is repeated in the same direction, the image is enlarged or reduced more and more.

The fourth embodiment of the present invention will be described next.

In this embodiment, the display magnification of an image can be changed in accordance with a scan direction as in the third embodiment without using the image size enlarging/reducing section 50 in the third embodiment.

Figure 4B:
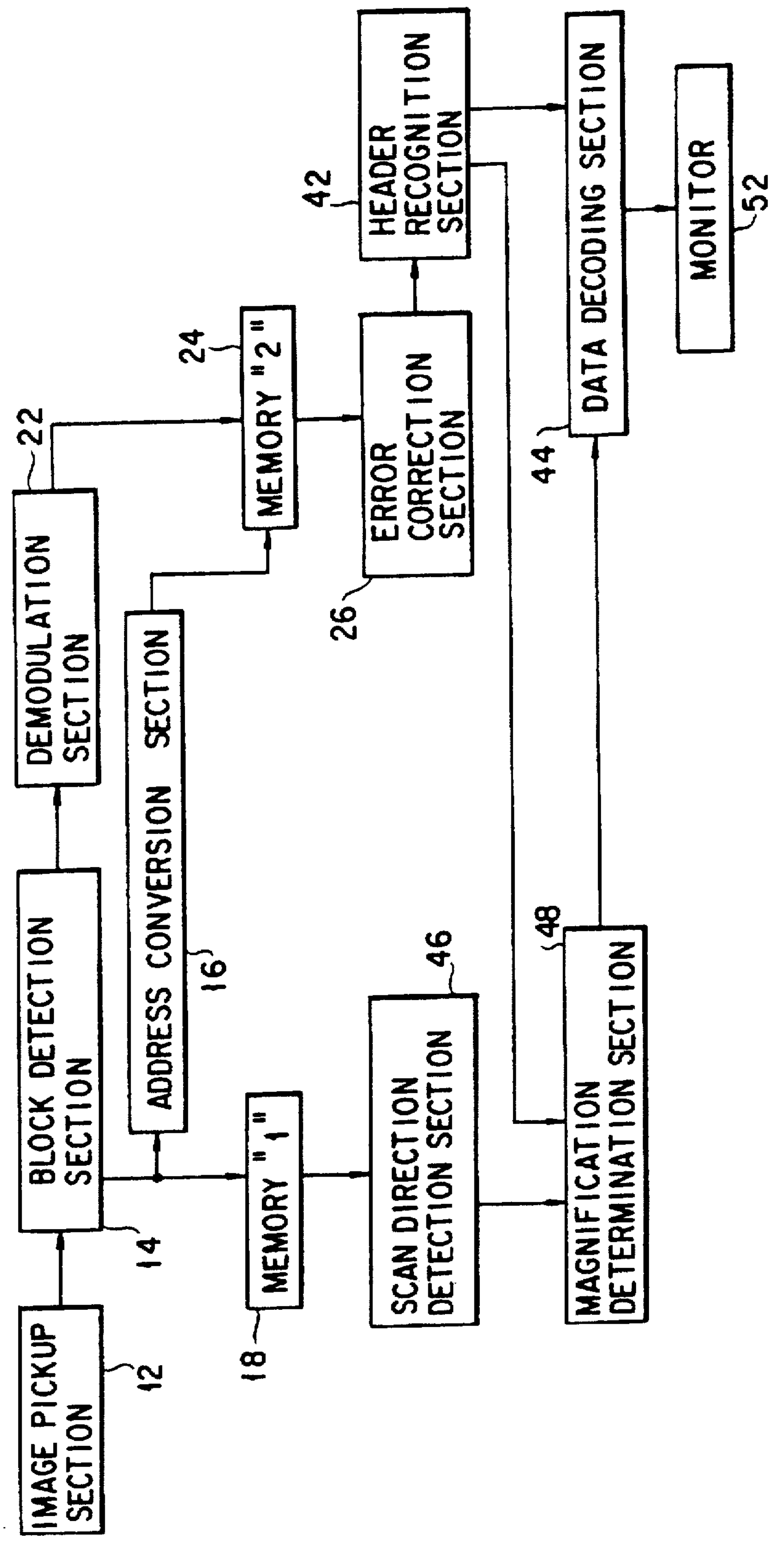
FIG. 4B is a block diagram showing the arrangement of an information reproduction apparatus according to the fourth embodiment of the present invention.

FIG. 4B shows the arrangement of this embodiment. The same reference numerals in FIG. 4B denote the same parts as in FIG. 1B. In the third embodiment, an output from the magnification determination section 48 is input to the image size enlarging/reducing section 50. In contrast to this, in the fourth embodiment, this output is supplied to a data decoding section 44, and an output from the data decoding section 44 is directly output to a monitor 52 to be displayed.

The data decoding section 44 sequentially decodes the compressed image data having undergone error correction on the basis of the magnification determined by the magnification determination section 48. Assume that the image data has been compressed by JPEG using two-dimensional DCT (Discrete Cosine Transform) based on an 8×8 block. In this case, a 16×16 block having this 8×8 data and the remaining portion filled with data "0" is generated. This block is then subjected to inverse transform to obtain an image enlarged at a magnification of 4. In contrast to this, when the 4×4 data in the 8×8 data is subjected to inverse transform, an image reduced at a magnification of ¼ is obtained.

Figure 7:
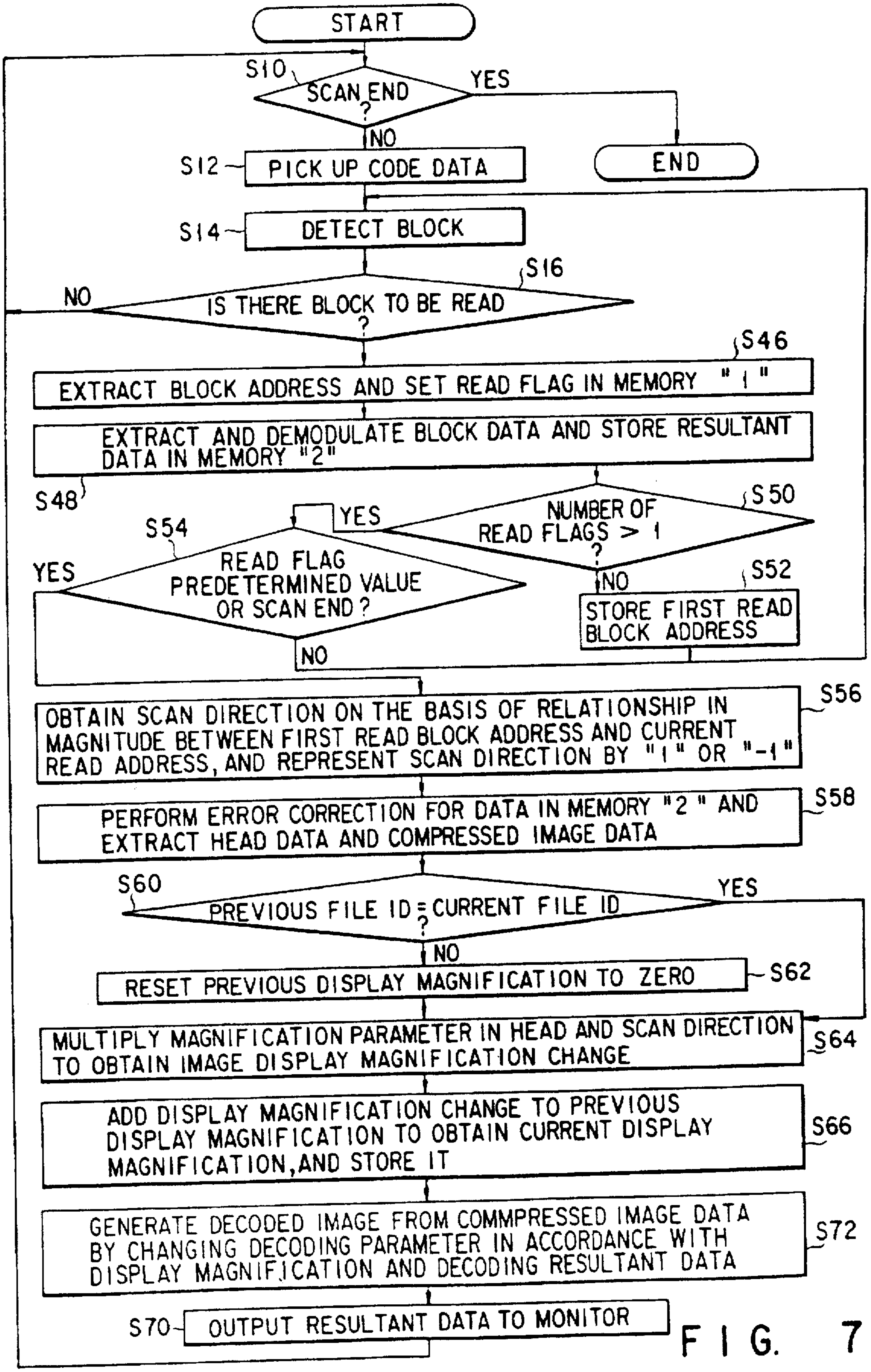
FIG. 7 is a flow chart showing the operation of the fourth embodiment.

FIG. 7 is a flow chart showing an operation in this case. The same reference symbols in FIG. 7 denote the same processing as in the flow chart of FIG. 6. In this embodiment, after a current display magnification is determined in step S66, the data decoding section 44 changes the decoding parameter for the compressed image data in accordance with the display magnification, and decodes the data, thereby generating decoded image data (step S72). This data is then output to the monitor 52 (step S70).

In the third and fourth embodiments, a mode switch or the like may be used to select normal reproduction or special reproduction. Alternatively, a scan speed detection means like the one in the first and second embodiments may be used to automatically switch the modes in accordance with a scan speed.

The fifth embodiment of the present invention will be described next.

Figure 8:
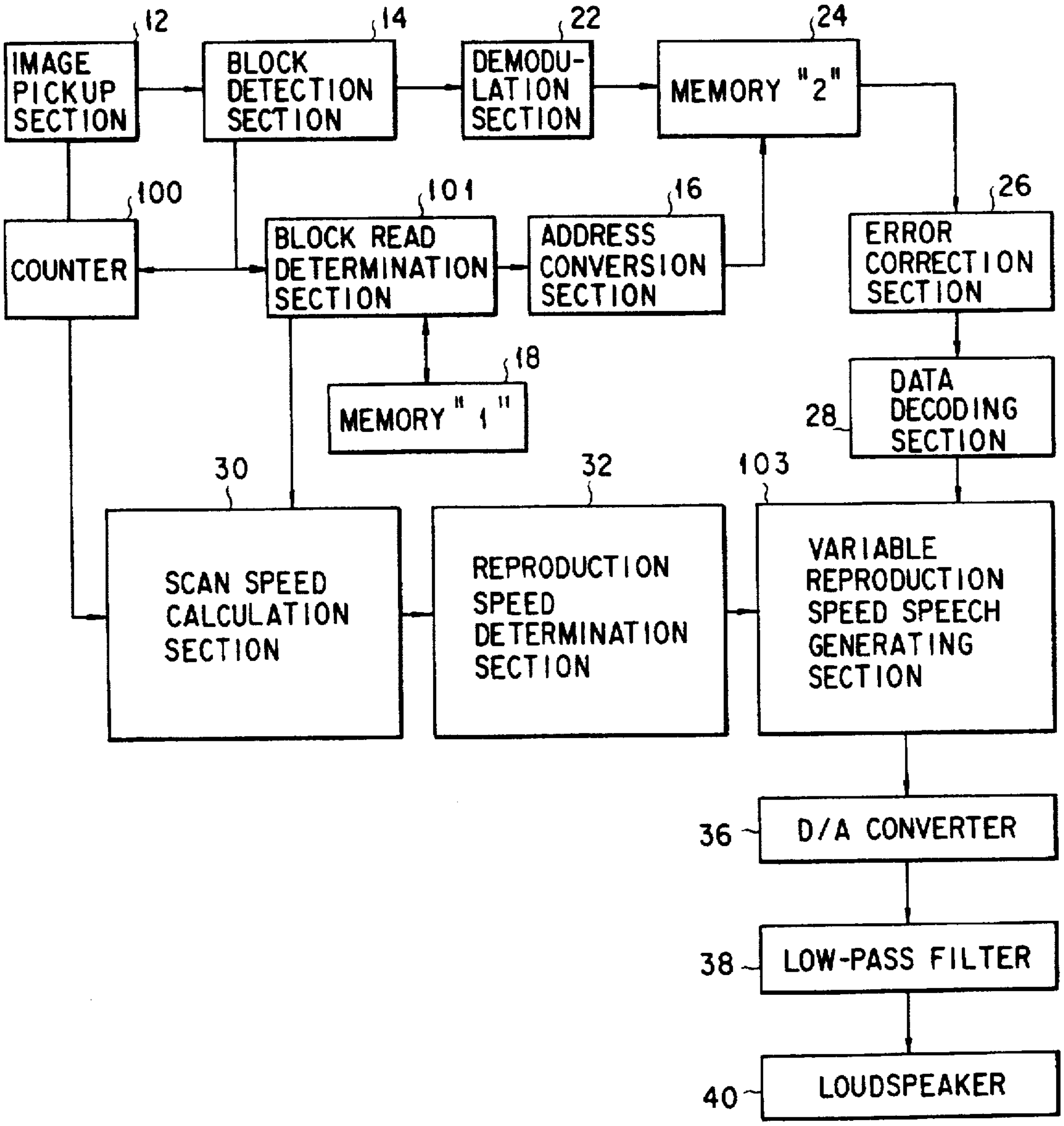
FIG. 8 is a block diagram showing the arrangement of an information reproduction apparatus according to the fifth embodiment of the present invention.

FIG. 8 shows the arrangement of an information reproduction apparatus according to the fifth embodiment of the present invention.

As shown in FIG. 8, the output terminals from an image pickup section 12 are respectively connected to input terminals of a counter 100 and a block detection section 14. The output terminals of the block detection section 14 are respectively connected to input terminals of the counter 100 and a block read determination section 101 and to an input terminal of a memory "2" 24 via a demodulation section 22. The block read determination section 101 is connected to a memory "1" 18 and is also connected to the memory "2" 24 via an address conversion section 16.

The output terminal of the counter 100 and an output terminal of the block read determination section 101 are connected to the input terminals of a scan speed calculation section 30. The output terminal of the scan speed calculation section 30 is connected to an input terminal of a variable reproduction speed speech generating section 103 via a reproduction speed determination section 32. The memory "2" 24 is connected to an input terminal of the variable reproduction speed speech generating section 103 via an error correction section 26 and a data decoding section 28. The output terminal of the variable reproduction speed speech generating section 103 is connected to a loudspeaker 40 via a D/A converter 36 and a low-pass filter 38.

In this arrangement, an image picked up by the image pickup section 12 is input to the block detection section 14. The block detection section 14 detects a code block in the image, and reads a header and data in the block. The block detection section 14 outputs a block detection signal to the counter 100. This block detection signal is "ON" when a block is detected; and "OFF" when no block is detected. The counter 100 counts the number of images only when the block detection signal is "ON". With this operation, of all images picked up by the image pickup section 12 for a predetermined period of time, only the number of images in which blocks are detected by the block detection section 14 is counted. The block detection section 14 inputs a block address written in the block header to the block read determination section 101. The block read determination section 101 recognizes a read block flag recorded on the memory "1" 18, and checks whether a block corresponding to the block address has been read.

If it is determined that the block is an unread block, a flag is set at a position corresponding to the block address in the memory "1" 18, and blocks read at different block addresses are counted. The unread block address is input to the address conversion section 16. The address conversion section 16 converts the address into a storage address in the memory "2" 24 at which corresponding block user data is stored, thereby controlling a write operation for the memory "2" 24. That is, the block user data read and modulated by the block detection section 14 is demodulated by the demodulation section 22 and stored at the above address, in the memory "2" 24, which is generated by the address conversion section 16.

The scan speed calculation section 30 receives the number of images, obtained by the counter 100, and the number of blocks read at different block addresses, obtained by the block read determination section 101, when a code scan operation comes to an end, or the block detection section 14 detects no block from the image picked up by the image pickup section 12. The scan speed calculation section 30 then calculates a scan speed on the basis of the ratio of the number of images to the number of blocks read.

The reproduction speed determination section 32 relates the scan speed calculated by the scan speed calculation section 30 to a speech reproduction speed. This reproduction speed may be continuously or discretely changed with respect to the scan speed.

The following is an example of reproduction speed:

$R\_V=(S\_V-A)\times B+1$.

For, if $R\_V \leqq MIN\_V$, then $R\_V=MIN\_V$ if $R\_V>MAX\_V$, then $R\_V=MAX\_V$ where R_V is the speech reproduction speed, S_Vis the scan speed, A is the standard scan speed, B is a coefficient, MIN_Vis the minimum reproduction speed, and MAX_V is the maximum reproduction speed. For example, if the scan speed S_V is 4 block/image, the speech reproduction speed R_V is MAX-V (=A×2). And if the scan speed S_V is 0.1 block/image, the speech reproduction speed R_V is MIN-V (=A×0.5). FIG. 12 shows the detailed relationship between the reproduction speed and the scan speed. In this case, the upper and lower reproduction speed limits are set because words and the like cannot be recognized if they are reproduced at excessively low or high speed.

The error correction section 26 performs error correction for the data stored in the memory "2" 24, and outputs the compressed speech data having undergone error correction. The data decoding section 28 decodes the compressed speech data, and outputs the decoded speech data to the variable reproduction speed speech generating section 103.

The variable reproduction speed speech generating section 103 generates speech data from the decoded speech data in accordance with the speech reproduction speed determined by the reproduction speed determination section 32. For example, the section 103 generates speech data corresponding to the reproduction speed by omitting or repeating speech data in units of predetermined sampling number. As a technique of generating this speech data, the technique disclosed in Jpn. Pat. Appln. KOKOKU Publication No. 60-2680 can be used. Since this technique is described in detail in this publication, a description thereof will be omitted here.

As is apparent, this variable reproduction speed speech generating section 103 may be used in place of the sampling frequency changing section 34 in the first embodiment. In this case, an output from the data decoding section 28 is not input to the D/A converter 36 but is input to the variable reproduction speed speech generating section 103 as in this embodiment.

The above speech data generated by the variable reproduction speed speech generating section 103 in this manner is converted into an analog signal by the D/A converter 36. The frequency band of this signal is limited by the low-pass filter 38. The resultant signal is then output as speech from the loudspeaker 40.

As described above, according to the fifth embodiment, there is provided an information reproduction apparatus which can easily detect a code scan speed, and can change a reproduction speed by relating the scan speed to a speech reproduction speed.

The sixth embodiment of the present invention will be described next.

FIG. 9 shows the arrangement of an information reproduction apparatus according to the sixth embodiment.

The information reproduction apparatus of this embodiment is characterized by control of a reproducing operation for image information as multimedia information particularly recorded as a code.

As shown in FIG. 9, the output terminals of an image pickup section 12 are respectively connected to input terminals of a counter 100 and a block detection section 14. The output terminals of the block detection section 14 are respectively connected to input terminals of the counter 100 and a block read determination section 150 and to an input terminal of a memory "2" 24 via a demodulation section 22. The block read determination section 150 is connected to a memory "1" 18 and is also connected to the memory "2" 24 via an address conversion section 16.

The output terminal of the counter 100 and an output terminal of the block read determination section 150 are connected to the input terminals of a scan speed & direction & count calculation section 151. The output terminal of the scan speed & direction & count calculation section 151 is connected to an input terminal of a reproduction speed & direction & variable magnification motion image data decoding section 153 via a reproduction speed & direction & magnification determination section 152. The memory "2" 24 is connected to an input terminal of the reproduction speed & direction & variable magnification motion image data decoding section 153 via an error correction section 26. The output terminal of the reproduction speed & direction & variable magnification motion image data decoding section 153 is connected to a TV monitor 156 via a D/A converter 154 and a low-pass filter 155.

In this arrangement, an image picked up by the image pickup section 12 is input to the block detection section 14. The block detection section 14 detects a code block in the image, and reads a header and data in the block.

The block address in the block header is input to the block read determination section 150. The block read determination section 150 refers to read block flags recorded in the memory "1" 18 connected to the determination section 150 so as to check whether a block corresponding to the above block address has already been read. If it is determined that the block has not been read, the block read determination section 150 sets a predetermined flag value "X" at a position corresponding to the block address in the memory "1" 18, and counts the number of blocks read at different block addresses.

The block read determination section 150 has functions of recording a different flag value "Y" in the memory "1" 18 with respect to only the block address detected first in a scan operation so as to use this value for scan direction calculation (to be described later), holding the latest detected block address value which has been the unread block, and clearing the contents of the memory "1" 18 to zero immediately after a predetermined parameter value is output to the scan speed & direction & count calculation section 151 (to be described later).

Note that "scan" means an image pickup period in which the block detection section 14 can continuously detect blocks from images, picked up by the image pickup section 12 at predetermined time intervals, from the start of detection of the first block. In this embodiment, every time scan is completed, i.e., the block detection section 14 cannot detect any block, parameters of the blocks which are obtained by the block read determination section 150 are output to the scan speed & direction & count calculation section 151, together with final scan determination information (to be described later).

Note that "final scan determination information" is constituted by information "EOS (End of Scan)" inserted when a scan start button mounted on an optical scanner is changed from the ON state to the OFF state, and information "SOS (Start of Scan)" inserted in the start portion of the above output parameters for each scan.

When the block read determination section 150 detects a block which has not been read, the detected block address is input to the address conversion section 16. The address conversion section 16 converts the block address into a storage address in the memory "2" 24 for storing the corresponding block user data, thereby controlling a write operation for the memory "2" 24. The demodulation section 22 demodulates the modulated block user data read by the block detection section 14, and stores the resultant data at the above address, in the memory "2" 24, which is generated by the address conversion section 16.

The counter 100 counts the number of images, of all images picked up by the image pickup section 12 at predetermined time intervals, from which blocks have been detected by the block detection section 14. For example, according to the NTSC (National Television System Committee) standard, field images are picked up at 1/60-sec intervals. Of these images, images from which blocks have been detected by the block detection section 14 are counted.

The block detection section 14 outputs a block detection signal, which is ON when a block is detected but is OFF when no block is detected, to the counter 100. That is, the number of images is counted only when the block detection signal is ON. With this operation, a scan period outside a code region can be omitted in calculating a scan speed to improve the precision in scan speed calculation.

The scan speed & direction & count calculation section 151 receives the number of images, obtained by the counter 100, and the number of blocks read at different block addresses, obtained by the block read determination section 150, when a code scan operation is completed, i.e., the scan start button on the optical scanner is changed from the ON state to the OFF state, or the block detection section 14 cannot detect any block from an image picked up by the image pickup section 12. The scan speed & direction & count calculation section 151 then calculates a scan speed on the basis of the ratio of the number of images to the number of blocks read.

In addition, first block address BlkAddr1 and second block address BlkAddr2 read by the block read determination section 150 are input to the scan speed & direction & count calculation section 151 to perform the following determination:

BlkAddr1−BlkAddr2 <0 . . . forward scan

BlkAddr1−BlkAddr2 >0 . . . reverse scan

In this case, the first block address is a block address detected first immediately after the scan start button on the optical scanner is turned on, or the block detection section 14 cannot detect any block from an image picked up by the image pickup section 12. This block address can be obtained by finding the flag value "Y" recorded in the memory "1" 18, i.e., a value corresponding to the block address detected first.

The second block address is the latest unread block address immediately before the scan start button is turned off or when the block detection section 14 cannot detect any block. The block address held in the block read determination section 150 at this time corresponds to this block address. If the second block address is detected a predetermined period of time after the first block address is detected, the second block address need not be a block address detected immediately after the scan start button is turned on or immediately before the scan start button is turned off. By the end of the above code scan operation, the number of times scan is performed is calculated from the number of times data is output, which is supplied from the block read determination section 150.

Figure 10:
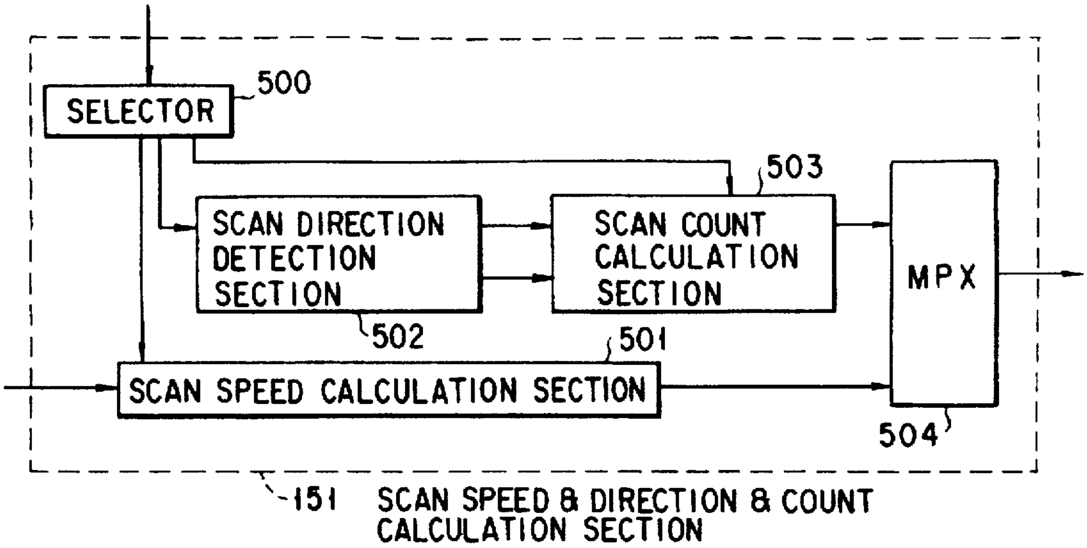
FIG. 10 is a block diagram showing the detailed arrangement of a scan speed & direction & count calculation section 151.

The detailed arrangement of the scan speed & direction & count calculation section 151 will be described below with reference to FIG. 10. Referring to FIG. 10, the number of block addresses, the first and second block addresses, and the final scan determination information, output from the block read determination section 150, are input to a selector 500 to be separated into the number of block addresses, the first and second block addresses, and the final scan determination information.

The number of block addresses is input to a scan speed calculation section 501. The number of images which is output from the counter 100 is also input to the scan speed calculation section 501. The scan speed calculation section 501 calculates a scan speed on the basis of these data.

For example, a scan speed is calculated by the following equation, and the calculated scan speed is output to an MPX 504:

scan speed=number of block addresses/number of images

Meanwhile, the first and second block addresses output from the selector 500 are input to a scan direction detection section 502. The scan direction detection section 502 detects a scan direction by the above scan direction detection method. Every time the above scan direction detection is performed, the scan direction detection section 502 outputs a detection signal indicating the execution of detection and the detected scan direction to a scan count calculation section 503.

The scan count calculation section 503 counts this input calculation signal in accordance with the above scan direction. In this count method, the section 503 adds "+1" to the count value when the scan direction is the forward direction, and adds "−1" to the count value when the scan direction is the reverse direction.

The scan direction is expressed by the positive/negative sign of the count value, and the number of times scan is performed is expressed by the absolute value of the count value. The above count value is output to the MPX 504 when the final scan determination information becomes "EOS". If, for example, a scan operation is performed twice in the forward direction, and once in the reverse direction, the resultant output from the scan count calculation section 503 has the sign "+1", which indicates that scan is performed once in the forward direction.

Assume that a scan operation is performed the same number of times in the reverse and forward directions. In such a special case, the output result is "0". This case will be referred to in the following description of the reproduction speed & direction & magnification determination section 152. This operation may be regarded as a scan operation performed once in the forward direction, or no scan operation.

The MPX 504 outputs the three input parameters (the scan speed, the scan direction, and the number of times scan is performed) in a predetermined order.

In the reproduction speed & direction & magnification determination section 152 in FIG. 9, a variable reproduction speed mode, a variable reproduction direction mode, and a variable reproduction magnification mode can be selected by a selection signal generated by a reproduction mode control switch (mounted on the optical scanner). These three modes can be separately or simultaneously selected.

When none of the above modes are selected, the reproduction speed & direction & magnification determination section 152 sets the parameters (the reproduction speed, the reproduction direction, and the reproduction magnification) for the modes, which are not selected, to predetermined values, and outputs them. More specifically, as the parameter values, the reproduction speed is set to a normal speed (×1 speed); the reproduction direction, to the forward direction (+1); and the reproduction magnification, to a magnification of 1. On the contrary, when the above modes are selected, the reproduction speed, the reproduction direction, and the reproduction magnification are changed/controlled in accordance with parameter values output from the scan speed & direction & count calculation section 151.

Figure 11:
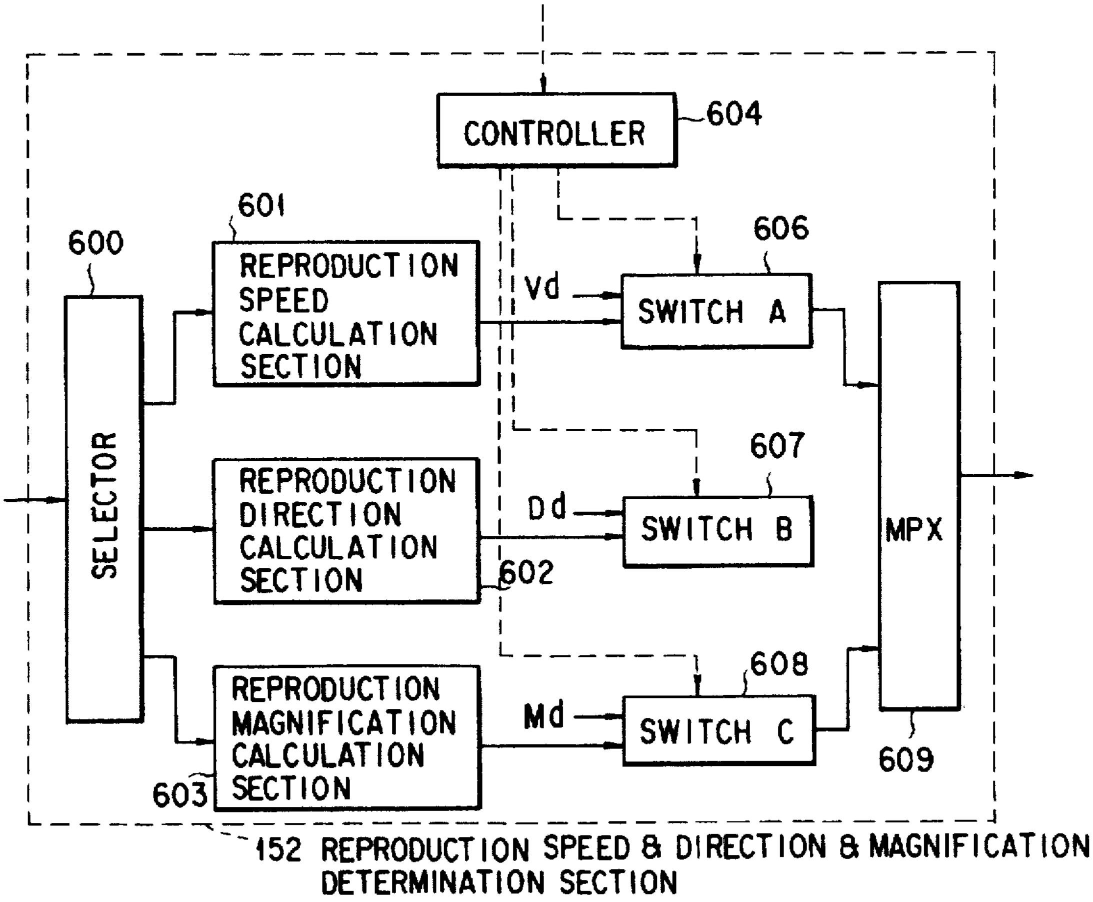
FIG. 11 is a block diagram showing the detailed arrangement of a reproduction speed & direction & magnification determination section 152.

FIG. 11 shows the detailed arrangement of the reproduction speed & direction & magnification determination section 152. Referring to FIG. 11, the three parameters (the scan speed, the scan direction, and the number of times scan is performed) output from the scan speed & direction & count calculation section 151 are input to a selector 600 to be separated into the respective parameters. The scan speed is input to a reproduction speed calculation section 601; the scan direction, to a reproduction direction calculation section 602; and the scan direction and the number of times scan is performed (the number of times with a sign), to a reproduction magnification calculation section 603.

The reproduction speed calculation section 601 relates the scan speed output from the selector 600 to a motion image reproduction speed. That is, a reproducing operation such as slow motion reproduction of a motion image, normal motion image reproduction based on the NTSC standard, or fast reproduction is executed. This reproduction speed may be continuously or discretely changed with respect to the scan speed.

The following is an example of reproduction speed:

$R\_V=(S\_V\_A)\times B+1$

For, if $R_V$ s $MIN_V$, then $R\_V=MIN\_V$ if $R\_V>MAX\_V$, then $R\_V=MAX\_V$ where R_V is the motion image reproduction speed, S_V is the scan speed, A is the standard scan speed, B is a coefficient, MIN_V is the minimum reproduction speed, and MAX_V is the maximum reproduction speed. FIG. 12 shows the relationship between the scan speed and the reproduction speed. The reproduction speed calculated in this manner is output to a switch A 606.

Assume that a selection signal generated by the above reproduction mode control switch is input to a controller 604, and the variable reproduction speed mode is selected. In this case, the controller 604 controls the switch A 606 to select an output from the reproduction speed calculation section 601. If the variable reproduction speed mode is not selected, the controller 604 controls the switch A 606 to select a predetermined value Vd. This selected reproduction magnification is output to an MPX 609.

The reproduction direction calculation section 602 relates a scan direction as an output from the selector 600 to a motion image reproduction direction. When a forward scan operation is performed, motion image reproduction is performed in the forward direction. When a reverse scan operation is performed, motion image reproduction is performed in the reverse direction.

Assume that a selection signal generated by the above reproduction mode control switch is input to the controller 604, and the variable reproduction direction mode is selected. In this case, the controller 604 controls a switch B 607 to select an output from the reproduction direction calculation section 602. If the variable reproduction direction mode is not selected, the controller 604 controls the switch B 607 to select a predetermined value Dd. The reproduction direction selected in this manner is output to the MPX 609.

The reproduction magnification calculation section 603 relates a scan direction and the number of times scan is performed from the selector 600 to a motion image reproduction magnification. When a forward scan operation is performed N times, the motion size is enlarged at a magnification of αN. When a reverse scan operation is performed N times, the image size is reduced at the magnification of αN. In this case, α represents a predetermined constant. Note that when the number of times scan is performed is "0" as described above, image data is processed without enlargement/reduction.

Assume that the selection signal generated by the above reproduction mode control switch is input to the controller 604, and the variable reproduction magnification mode is selected. In this case, the controller 604 controls a switch C 608 to select an output from the reproduction magnification calculation section 603. If the variable reproduction magnification mode is not selected, the controller 604 controls the switch C 608 to select a predetermined value Md. The reproduction direction selected in this manner is output to the MPX 609.

The reproduction parameters output from the switches A 606, B 607, and C 608 are arranged in the MPX 609 in a predetermined order, and are output to the reproduction speed & direction & variable magnification motion image data decoding section 153. The error correction section 26 performs error correction for the data stored in the memory "2" 24. The compressed motion image data having undergone error correction is output to the reproduction speed & direction & variable magnification motion image data decoding section 153.

In the reproduction speed & direction & variable magnification motion image data decoding section 153 in FIG. 9, the input compressed motion image data is decoded on the basis of the reproduction parameters (the reproduction speed, the reproduction direction, and the reproduction magnification) from the reproduction speed & direction & magnification determination section 152, and each frame (or field) of the decoded motion image data is output to the D/A converter 154 upon raster scanning. The D/A converter 154 converts each frame (or field) of the decoded motion image data having undergone raster scanning into an analog signal. The frequency band of this analog signal is controlled by the low-pass filter 155. The resultant data is output to the TV monitor 156. With this operation, an image is reproduced.

The operation of the reproduction speed & direction & variable magnification motion image data decoding section 153 will be described in detail below with reference to FIGS. 13 to 19E.

Figure 13:
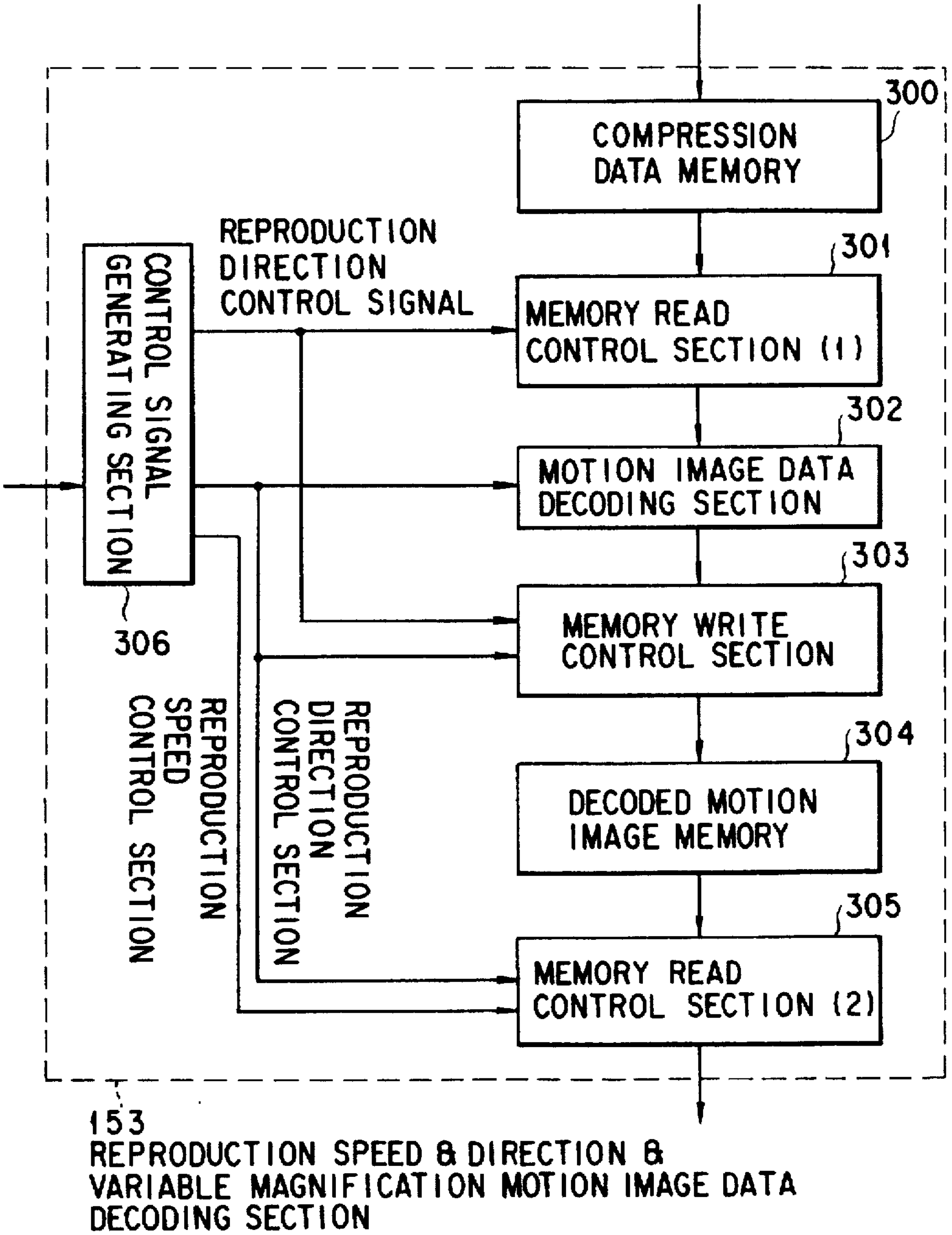
FIG. 13 is a block diagram showing the arrangement of a reproduction speed & direction & variable magnification motion image data decoding section 153.
Figure 14:
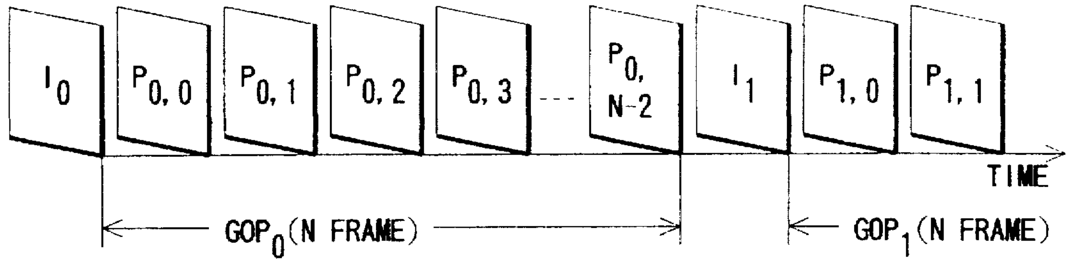
FIG. 14 is a view showing a coded frame arrangement without any bidirectionally predictive coded frame of MPEG as an international standard of motion image compression schemes for storage media.

FIG. 13 shows the arrangement of the reproduction speed & direction & variable magnification motion image data decoding section 153. FIG. 14 shows a coded frame arrangement without any bidirectionally predictive coded frame of MPEG (Motion Picture Experts Group) as an international standard of motion image compression schemes for storage media. A motion image compression scheme will be described with reference to FIG. 14.

Referring to FIG. 14, reference symbol $I_x$ denotes an intraframe coded frame (coded by using only an intraframe correlation); and $P_{x,y}$, an interframe coded frame (coded by using also a correlation with a past frame). Intraframe coded frames are inserted every N frames. This period is called a GOP (Group Of Picture). Note that the affix "x" indicates the identification number of a GOP, and the affix "y" indicates the identification number of interframe coded frame in a GOP. Both the affixes indicate older data as the numbers become smaller. Data coded by MPEG are data which can be separately decoded in units of GOPs.

One-code motion image data compressed by MPEG and output from the error correction section 26 is stored in a compressed data memory 300.

Figure 15:
FIG. 15 is a view showing an example of the format of stored data.

FIG. 15 shows an example of the format of this stored data.

Each of $GOP_0$ data, $GOP_1$ data, . . . , $GOP_{M-1}$ is GOP data to which a header conforming to MPEG is added. A GOP offset table is table data containing the start position of each GOP. This portion has a unique format which does not conform to MPEG.

Reproduction speed, reproduction direction, and reproduction magnification data output from the reproduction speed & direction & magnification determination section 152 are input to a control signal generating section 306 to generate a reproduction speed control signal, a reproduction direction control signal, and a reproduction magnification control signal.

The reproduction direction control signal is input to a memory read control section (1) 301; the reproduction magnification control signal, to a motion image data decoding section 302; the reproduction direction control signal and the reproduction magnification control signal, to a memory write control section 303; and the reproduction speed control signal and the reproduction magnification control signal, to a memory read control section (1) 305. The GOP offset table stored in the compressed data memory 300 is loaded in the memory read control section (1) 301.

Figure 16A:
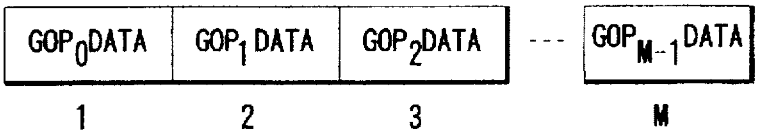
FIG. 16A is a view showing the order in which compressed data are input to a motion image data decoding section in the forward reproduction mode.
Figure 16B:
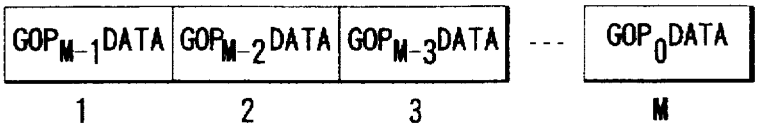
FIG. 16B is a view showing the order in which compressed data are input to the motion image data decoding section in the reverse reproduction mode.

FIGS. 16A and 16B are views showing the orders in which the memory read control section (1) 301 reads out data from the compressed data memory 300. More specifically, as shown in FIG. 16A, when reproduction is to be performed in the forward direction, compressed data are sent from the compressed data memory 300 to the motion image data decoding section 302 in units of GOPs in the ascending order of the GOP numbers on the basis of the offset values of the GOP offset table.

As shown in FIG. 16B, when reproduction is to be performed in the reverse direction, compressed data are sent from the compressed data memory 300 to the motion image data decoding section 302 in units of GOPs in the descending order of the GOP numbers on the basis of the offset values of the GOP offset table.

Figure 18:
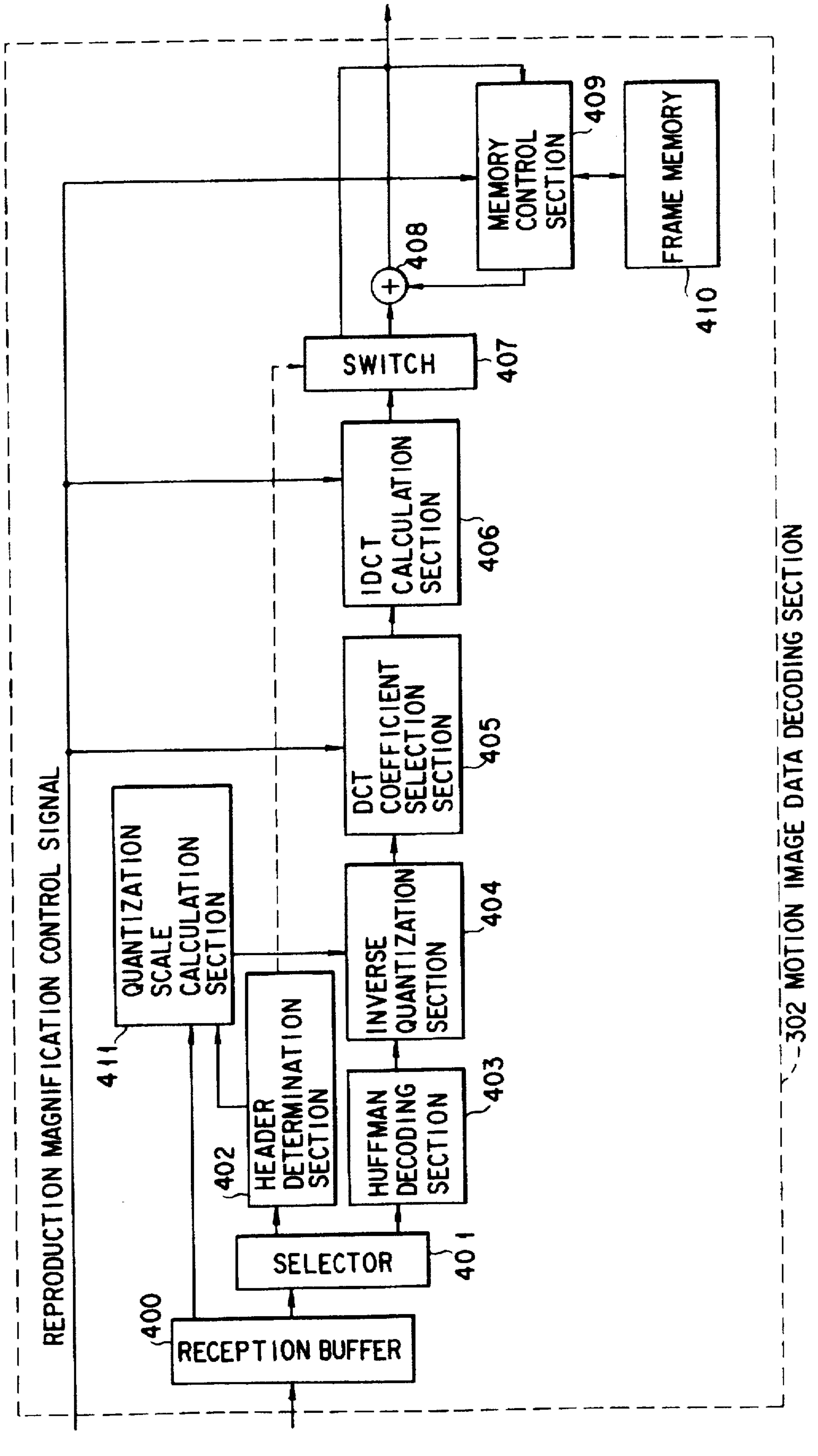
FIG. 18 is a block diagram showing the detailed arrangement of a motion image data decoding section 302.
Figure 20:
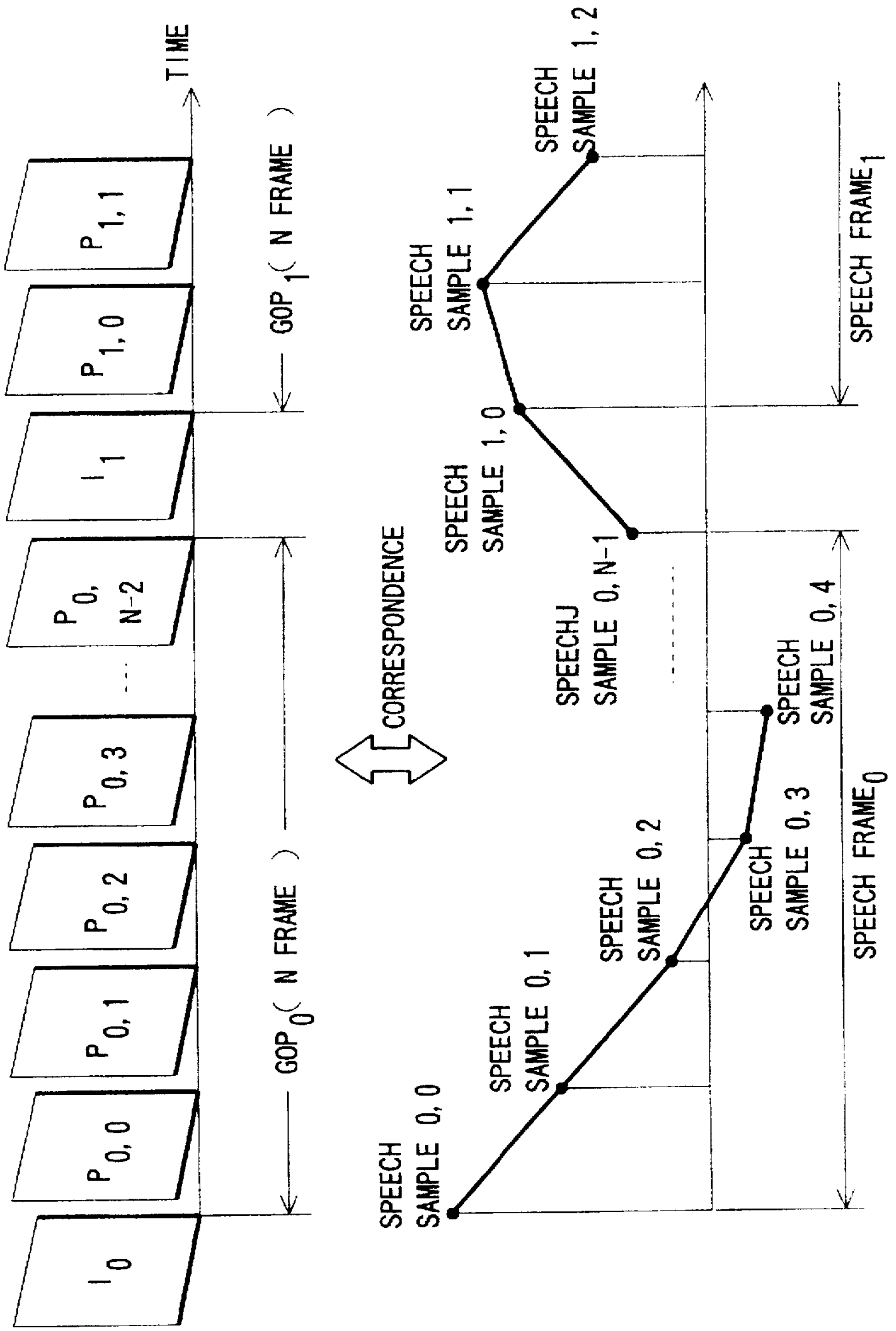
FIG. 20 is a view showing a relationship in which a GOP corresponds to a speech frame, and a motion image frame corresponds to one speech sample.

FIG. 18 shows the detailed arrangement of the motion image data decoding section 302.

As shown in FIG. 18, the compressed data output from the memory read control section (1) 301 in units of GOPs are temporarily input to a reception buffer 400, and are output to a selector 401. The reception buffer 400 outputs its reception buffer occupation amount to a quantization scale calculation section 411. The selector 401 separates each data into a header portion and a Huffman code portion. The header portion and the Huffman portion are respectively output to a header determination section 402 and a Huffman decoding section 403. The data decoded by the Huffman decoding section 403 is output to an inverse quantization section 404. The quantization scale calculation section 411 receives the reception buffer occupation amount and an initial quantization scale from the header determination section 402, and calculates a quantization scale for the current decoding operation on the basis of these two amounts.

The inverse quantization section 404 performs inverse quantization of the data output from the Huffman decoding section 403 on the basis of the quantization scale output from the quantization scale calculation section 411 to obtain 8×8 DCT (Discrete Cosine Transform) coefficients, and outputs the coefficients to a DCT coefficient selection section 405. The DCT coefficient selection section 405 selects coefficients to be used from the 8×8 DCT coefficients on the basis of a reproduction magnification control signal.

FIGS. 19A to 19E show the relationship between the reproduction magnification and the selected coefficients. More specifically, FIG. 19D shows DCT coefficients for a standard magnification. FIGS. 19A, 19B, and 19C, and 19E respectively show DCT coefficients for magnifications of $(1/8)^2$, $(1/4)^2$, $(1/2)^2$, and $(N/8)^2$. When a magnification of $(1/2)^2$ is set, only DCT coefficients $C_{00}$ to $C_{33}$ of DCT coefficients $C_{00}$ to $C_{77}$ for the standard magnification are used. When a magnification of $(1/4)^2$, only the DCT coefficients $C_{00}$ to $C_{11}$ of the DCT coefficients $C_{00}$ to $C_{77}$ for the standard magnification are used. When a magnification of $(1/8)^2$ is set, only the DCT coefficient $C_{00}$ of the DCT coefficients $C_{00}$ to $C_{77}$ for the standard magnification is used. When a magnification of $(N/8)^2$ is set, the DCT coefficients $C_{00}$ to $C_{77}$ for the standard magnification and "0" as other coefficients are used but N is an integral number greater than 8.

The coefficients selected in this manner are output as a two-dimensional array to an IDCT calculation section 406. The IDCT operation section 406 changes the size of the IDCT calculator on the basis of a reproduction magnification control signal, and performs inverse DCT for the input DCT coefficients, thereby restoring image data or interframe predictive error data. The restored data is output to a switch 407. The switch 407 performs a switching operation based on a coding method determined by the header determination section 402.

If intraframe coding is determined, the output from the switch 407 is not connected to an adder 408 but is output to the motion image data decoding section 302 and is also output to a memory control section 409. If interframe coding is determined, the output from the switch 407 is connected to the adder 408. The adder 408 adds a reference frame data read out from a frame memory 410 by the memory control section 409 one frame before the current frame to the output from the switch 407. The resultant data is output to the motion image data decoding section 302 and is also output to the memory control section 409.

The memory control section 409 controls the read/write positions (in the frame memory 410) of the input data serving as a reference frame for a decoding operation for the next frame and the reference frame data for the current frame which is to be output. The decoded motion image data output from the motion image data decoding section 302 is output to the memory write control section 303. The memory write control section 303 controls the storage position of the input decoded motion image data in a decoded motion image memory 304 on the basis of the reproduction direction control signal and the reproduction magnification control signal.

Figure 17:
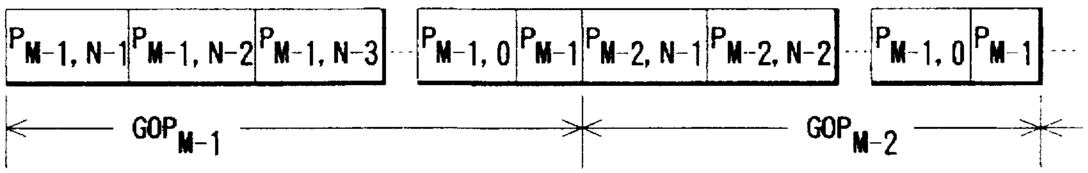
FIG. 17 is a view showing the order in which decoded frames are stored in a decoded motion image memory in the reverse reproduction mode.

FIG. 17 shows the storage order of decoded frames in a case wherein reproduction is performed in the reverse direction.

When reproduction is to be performed in the reverse direction, a $GOP_{M-1}$ consisting of interframe coded frames $P_{M-1,N-1}$, $P_{M-1,N-2}$, . . . , $P_{M-1,0}$, and an intraframe coded frame IM-1 is stored first, and $GOP_{M-2}$ consisting of interframe coded frames $P_{M-2,N-1}$, $P_{M-2,N-2}$, . . . , $P_{M-2,0}$, and an intraframe coded frame $I_{M-2}$ is then stored. Similarly, a $GOP_{M-3}$, . . . are sequentially stored.

As described above, in the forward reproduction mode, an intraframe coded frame is stored first. In the reverse reproduction mode, however, interframe coded frames are stored first, and an intraframe coded frame is then stored.

The decoded motion image memory 304 has a capacity enough to store motion image frames corresponding to two decoded GOPs. Even in the reverse reproduction mode, therefore, a reproducing operation can be performed without posing any problems. Decoding in one GOP is performed on the basis of a past frame. For this reason, in the reverse reproduction mode, when decoding of one GOP is completed, the first frame is generated. When reverse reproduction is to be performed continuously, while one GOP is reproduced, decoding of the next GOP needs to be completed. This operation therefore requires at least a memory capacity large enough to concurrently store a GOP which is being reproduced and a GOP which is being decoded.

The memory read control section (2) 305 reads out motion image frames from the decoded motion image memory 304 on the basis of a reproduction speed control signal and a reproduction magnification control signal. If the reproduction speed is N times lower than the standard speed, the same frame is repeatedly read N times and output to the D/A converter 154. If the reproduction speed is N times higher than the standard speed, (N−1) frames of N frames are skipped, and the resultant data is output to the D/A converter 154.

In the above description, MPEG is used as a motion image compression scheme. However, other compression schemes may be used as long as the GOP structure can be maintained. In addition, a GOP may be constituted by one frame, and the frame may be coded by using a still image compression scheme, e.g., JPEG (Joint Photographic Coding Experts Group) without posing any problems.

In addition, as is apparent, with respect to a speech compression scheme as well, a reproduction speed, a reproduction direction, and a reproduction magnification (volume) can be easily changed. The reproduction speed can be changed in the same manner as described in the fifth embodiment. With regard to the reproduction direction, if a known speech compression scheme of coding data in units of speech frames, e.g., ADPCM (Adaptive Differential Pulse Code Modulation) or CELP (Code Excited Linear Prediction), is used, since the above GOP corresponds to a speech frame, and a motion image frame corresponds to one speech sample, various data processing operations can be performed. The reproduction magnification can be changed by multiplying each decoded speech sample by a set magnification. Therefore, there is provided an information reproduction apparatus which can easily detect a code scan speed, a scan direction, and the number of times scan, and can change a reproduction speed, a reproduction direction, and a reproduction magnification by relating the scan speed, the scan direction, and the number of times scan is performed to the reproduction speed, the reproduction direction, and the reproduction magnification.

As has been described in detail above, according to the present invention, special speech reproduction (slow and first reproduction modes e.g.) or special image reproduction (enlargement and reduction e.g.) can be easily performed by only a conventional manual scan operation without performing any new operation. In addition, the present invention can be applied to a code system including an array of a plurality of blocks each having a fixed size but not having a start code, a stop code, and a length code. Even when only a local portion of a code is scanned, the apparatus can calculate a scan speed.

The present invention has been described above on the basis of the above embodiments. However, the present invention is not limited to the above embodiments, and various changes and modifications can be made within the spirit and scope of the present invention. The gist of the present invention is as follows:

(1) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each block having a data code arranged in correspondence with the multimedia information, and an address code arranged at a predetermined position with respect to the data code in correspondence with an address of the block, and said read means includes reproducing operation control means for controlling a reproducing operation of the output means on the basis of a state of an address change based on an address code of a block read by the read means in a scan operation.

According to this arrangement, only utilizing element of the read code data a reproducing operation for multimedia information can be easily controlled without performing any new operation.

(2) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes count means for counting and storing the number of times the same block address is read by the read means, scan speed calculation means for calculating a scan speed of the read means on the basis of the number of times the same block is read, which is counted/ memorized by the count means, reproduction speed determination means for determining a speech reproduction speed from the scan speed calculated by the scan speed calculation means, and speech output means for reproducing/outputting speech information, restored by the processing means, in accordance with the reproduction speed determined by the reproduction speed determination means.

According to this arrangement, a manual scan speed can be easily detected without performing any new operation, and a speech reproduction speed can be controlled in accordance with the detected scan speed.

(3) In the information reproduction apparatus according to arrangement (2), the scan speed calculation means determines, as a parameter, a maximum number of times the same block address is read within an interval in which a predetermined number of blocks are read.

According to this arrangement, a change in scan speed within one code can be detected with high sensitivity.

(4) In the information reproduction apparatus according to arrangement (2), the scan speed calculation means determines, as a parameter, an average number of times the same block address is read within an interval in which a predetermined number of blocks are read.

According to this arrangement, a change in scan speed within one code can be made moderate, and an abrupt change need not be detected.

(5) There is provided an information reproduction apparatus comprising read means for optically scanning and reading a code, as a two-dimensional image, from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, scan speech calculation means for calculating a scan speed from the number of images and the number of different detected block addresses which are counted by the first and second count means, reproduction speed determination means for determining a speech reproduction speed from the scan speed calculated by the scan speed calculation means, and speech output means for reproducing/outputting speech information, restored by the processing means, in accordance with the reproduction speed determined by the reproduction speed determination means.

According to this arrangement, a manual scan speed can be easily detected without performing any new operation, and a speech reproduction speed can be controlled in accordance with the detected scan speed.

(6) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, reproduction direction determination means for determining a speech reproduction direction from the scan direction detected by the scan direction detection means, and speech output means for reproducing/outputting speech information, restored by the processing means, in accordance with the reproduction direction determined by the reproduction direction determination means.

According to this arrangement, a manual scan direction can be easily detected without performing any new operation, and a speech reproduction direction can be changed in accordance with the scan direction.

(7) According to arrangement (6), the plurality of block addresses detected at the predetermined time intervals are two block addresses detected at an interval corresponding to a predetermined number of blocks.

According to this arrangement, a scan direction can be easily detected even in the process of scanning one code.

(8) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, scan count means for counting the number of times scan direction detection is performed by the scan direction detection means, and setting the counted number of times as the number of times the same code is scanned, reproduction volume determination means for determining a speech reproduction volume on the basis of the scan direction detected by the scan direction detection means and the number of times the same code is scanned, which is detected by the scan count means, and speech output means for reproducing/outputting speech information, restored by the processing means, in accordance with the reproduction volume determined by the reproduction volume determination means.

According to this arrangement, a scan direction and the number of times scan is performed can be easily detected without performing any new operation, and a speech reproduction volume can be changed in accordance with this scan direction and this number of times scan is performed.

(9) According to arrangements (6) and (8), the plurality of block addresses are block addresses respectively detected first and last in a scan interval in which block addresses are continuously detected from an image pickup by the read means.

According to this arrangement, even if scan is repeated a plurality of number of times, a scan direction can be easily detected in each scan operation.

(10) According to arrangement (8), when the number of times the same code is scanned is N, the reproduction volume determination means multiplies a volume by N if a scan direction is a forward direction, and multiplies the volume by 1/N if the scan direction is a reverse direction.

According to this arrangement, an increase/decrease in reproduction volume can be easily controlled by only changing a scan direction and the number of times scan is performed.

(11) According to arrangement (8), the reproduction volume determination means uses a previous speech reproduction volume of the same code as an offset amount, and a scan direction as ±1, and adds a volume change multiplied by a predetermined volume to the offset amount, thereby performing determination.

According to this arrangement, an increase/decrease in reproduction volume can be easily controlled by only changing a scan direction and the number of times scan is performed.

(12) According to arrangement (11), the predetermined volume is recorded as data in a code.

According to this arrangement, a predetermined volume can be set for each code instead of being set to a fixed value. This increases the degree of freedom in reproduction and hence can effectively reflect the intention of the person who generates the code.

(13) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address block arranged at a predetermined position with respect to the data code in correspondence with an address of the block, and the output means includes first count means for counting the number of images from which block addresses have been detected by the read means, second count means for counting the number of different detected block addresses, count output control means for performing control to output count values from the first and second count means when no block address can be detected by the read means, block address storage means for storing a plurality of block addresses detected by the read means at predetermined time intervals, scan speed calculation means for calculating a scan speed on the basis of the number of images and the number of different detected block addresses which are respectively counted by the first and second count means whose outputs are controlled by the count output control means, third count means for counting the number of output count values controlled by the count output control means, scan count calculation means for calculating the number of times scan is performed on the basis of a count value obtained by the third count means, scan direction detection means for detecting a scan direction from the plurality of block addresses, reproduction speed determination means for determining a speech reproduction speed from the scan speed calculated by the scan speed calculation means, reproduction direction determination means for determining a speech reproduction direction from the scan direction detected by the scan direction detection means, reproduction volume determination means for determining a speech reproduction volume on the basis of the number of times scan is performed, which is calculated by the scan count calculation means, and the scan direction calculated by the scan direction calculation means, speech restoration means for restoring speech information from the reproduction volume determined by the reproduction volume determination means, and speech output means for reproducing/outputting the speech information in accordance with the reproduction speed determined by the reproduction speed determination means and the reproduction direction determined by the reproduction direction determination means.

According to this arrangement, a manual scan speed, a scan direction, and the number of times scan is performed can be easily detected without performing any new operation, and a speech reproduction speed, a reproduction direction, and a reproduction volume can be changed in accordance with these parameters.

(14) The information reproduction apparatus according to arrangement (13) further comprises reproduction parameter fixing means for fixing output parameters from the reproduction speed determination means, the reproduction volume determination means, and the reproduction direction determination means to predetermined values, and a selection means (switch) for selecting an output parameter which is fixed to a predetermined value by the reproduction parameter fixing means.

According to this arrangement, changes in speech reproduction speed in accordance with a manual scan speed, speech reproduction volume in accordance with a scan direction and the number of times scan is performed, and speech reproduction direction in accordance with a scan direction can be inhibited/selected in accordance with a user's intention.

(15) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes count means for counting and storing the number of times the same block address is read by the read means, scan speed calculation means for calculating a scan speed of the read means on the basis of the number of times of the same block address is read, which is counted/memoried by the count means, reproduction speed determination means for determining a motion image reproduction speed from the scan speed calculated by the scan speed calculation means, and motion image output means for reproducing/outputting motion image information, restored by the processing means, in accordance with the reproduction speed determined by the reproduction speed determination means.

According to this arrangement, a manual scan speed can be easily detected without performing any new operation, and a motion image reproduction speed can be controlled in accordance with this detected scan speed.

(16) According to arrangement (15), the scan speed calculation means determines, as a parameter, a maximum number of times the same block address is read in an interval in which a predetermined number of blocks are read.

According to this arrangement, a change in scan speed within one code can be detected with high sensitivity.

(17) According to arrangement (15), the scan speed calculation means determines, as a parameter, an average number of times the same block address is read in an interval in which a predetermined number of blocks are read.

According to this arrangement, a change in scan speed within one code can be made moderate, and an abrupt change need not be detected.

(18) There is provided an information reproduction apparatus comprising read means for optically scanning and reading a code, as a two-dimensional image, from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, scan speech calculation means for calculating a scan speed from the number of images and the number of different detected block addresses which are counted by the first and second count means, reproduction speed determination means for determining a motion image reproduction speed from the scan speed calculated by the scan speed calculation means, and motion image output means for reproducing/outputting motion image information, restored by the processing means, in accordance with the reproduction speed determined by the reproduction speed determination means.

According to this arrangement, a manual scan speed can be easily detected without performing any new operation, and a motion image reproduction speed can be controlled in accordance with this detected scan speed.

(19) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, reproduction direction determination means for determining a motion image reproduction direction from the scan direction detected by the scan direction detection means, and motion image output means for reproducing/outputting motion image information, restored by the processing means, in accordance with the reproduction direction determined by the reproduction direction determination means.

According to this arrangement, a manual scan direction can be easily detected without performing any new operation, and a motion image reproduction direction can be changed in accordance with this scan direction.

(20) In the information reproduction apparatus according to arrangement (19), the plurality of block addresses detected at the predetermined time intervals are two block addresses detected at an interval corresponding to a predetermined number of blocks.

According to this arrangement, a scan direction can be easily detected even in the process of scanning one code.

(21) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least in a scan direction, each code having a data code arranged in correspondence with the multimedia information, and an address code arranged at a predetermined position with respect to the data code in correspondence with an address of the block, and the output means includes block address storage means for storing a plurality of block addresses detected by the read means at predetermined time intervals, scan direction detection means for detecting a scan direction on the basis of the plurality of block addresses, scan count means for counting the number of times scan direction detection is performed by the scan direction detection means, and setting the counted number of times as the number of times the same code is scanned, reproduction magnification determination means for determining an image reproduction magnification on the basis of the scan direction detected by the scan direction detection means and the number of times the same code is scanned, which is detected by the scan count means, and image output means for reproducing/outputting image information, restored by the processing means, in accordance with the reproduction magnification determined by the reproduction magnification determination means.

According to this arrangement, a manual scan direction and the number of times scan is performed can be easily detected without performing any new operation, and an image reproduction magnification can be changed in accordance with this scan direction and the number of times scan is performed.

(22) According to arrangements (19) and (20), the plurality of block addresses are block addresses respectively detected first and last in a scan interval in which block addresses are continuously detected from an image pickup by the read means.

According to this arrangement, even if scan is repeated a plurality of number of times, a scan direction can be easily detected in each scan operation.

(23) In the information reproduction apparatus according to arrangement (21), when the number of times the same code is scanned is N, the reproduction magnification determination means multiplies a magnification by N if a scan direction is a forward direction, and multiplies the magnification by 1/N if the scan direction is a reverse direction.

According to this arrangement, the enlargement, reduction, and magnification of a motion image to be reproduced can be easily controlled by only changing the scan direction and the number of times scan is performed.

(24) In the information reproduction apparatus according to arrangement (21), the reproduction magnification determination means uses a previous motion image reproduction magnification of the same code as an offset amount, and a scan direction as ±1, and adds a magnification change multiplied by a predetermined magnification to the offset amount, thereby performing determination.

According to this arrangement, the enlargement, reduction, and magnification of a motion image to be reproduced can be easily controlled by only changing the scan direction and the number of times scan is performed.

(25) In the information reproduction apparatus according to arrangement (22), the predetermined magnification is recorded as data in a code.

According to this arrangement, a predetermined magnification can be set for each code instead of being set to a fixed value. This increases the degree of freedom in reproduction and hence can effectively reflect the intention of the person who generates the code.

(26) There is provided an information reproduction apparatus comprising read means for optically scanning and reading a code from a recording medium, the code being multimedia information including at least one of speech information, image information, and text data and recorded as an optically readable code, processing means for processing the code read by the read means and restoring the code into the multimedia information, and output means for reproducing and outputting each piece of information on the basis of an output signal from the processing means, wherein the code has a plurality of blocks arranged in at least a scan direction, each code having a data code arranged in correspondence with the multimedia information, and an address code arranged at a predetermined position with respect to the data code in correspondence with an address of the block, and the output means includes first count means for counting the number of images from which block addresses have been detected by the read means, second count means for counting the number of different detected block addresses, count output control means for performing control to output count values from the first and second count means when no block address can be detected by the read means, block address storage means for storing a plurality of block addresses detected by the read means at predetermined time intervals, scan speed calculation means for calculating a scan speed on the basis of the number of images and the number of block addresses which are respectively counted by the first and second count means whose outputs are controlled by the count output control means, third count means for counting the number of output count values controlled by the count output control means, scan count calculation means for calculating the number of times scan is performed on the basis of a count value obtained by the third count means, scan direction detection means for detecting a scan direction from the plurality of block addresses, reproduction speed determination means for determining a motion image reproduction speed from the scan speed calculated by the scan speed calculation means, reproduction direction determination means for determining a motion image reproduction direction from the scan direction detected by the scan direction detection means, reproduction magnification determination means for determining a motion image reproduction magnification on the basis of the number of times scan is performed, which is calculated by the scan count calculation means, and the scan direction calculated by the scan direction calculation means, motion image restoration means for restoring motion image information from the reproduction magnification determined by the reproduction magnification determination means, and motion image output means for reproducing/outputting the motion image information in accordance with the reproduction speed determined by the reproduction speed determination means and the reproduction direction determined by the reproduction direction determination means.

According to this arrangement, a manual scan speed, a scan direction, and the number of times scan is performed can be easily detected without performing any new operation, and a motion image reproduction speed, a reproduction direction, and a reproduction magnification can be changed in accordance with these parameters.

(27) The information reproduction apparatus according to arrangement (26) further comprises reproduction parameter fixing means for fixing output parameters from the reproduction speed determination means, the reproduction magnification determination means, and the reproduction direction determination means to predetermined values, and a selection means (switch) for selecting an output parameter which is fixed to a predetermined value by the reproduction parameter fixing means.

According to this arrangement, changes in motion image reproduction speed in accordance with a manual scan speed, motion image reproduction magnification in accordance with a scan direction and the number of times scan is performed, and motion image reproduction direction in accordance with a scan direction can be inhibited in accordance with a user's intention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproduction apparatus comprising:

a read unit for optically scanning and reading a code from a recording medium, the code being multimedia information including at least one of speech information, image information, and text data and the code being recorded as an optically readable code;

a processor for processing the code read by said read unit and restoring the code into the multimedia information; and an output unit for reproducing and outputting each piece of information on the basis of an output signal from said processor, wherein the code has a plurality of blocks arranged in at least a scan direction, each block having a data code arranged in correspondence with the multimedia information, and an address code arranged at a predetermined position with respect to the data code in correspondence with an address of the block, and wherein said output unit includes reproducing operation control means for calculating an amount of change that occurs per unit time in an address value of a block by checking an address code scanned and read by said read unit and for controlling a reproducing operation of each piece of information in accordance with said amount of change.

2. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

count means for counting and storing the number of times the same block address is read by said read means;

scan speed calculation means for calculating a scan speed of said read means on the basis of the number of times the same block is read, which is counted/memorized by said count means;

reproduction speed determination means for determining a speech reproduction speed from the scan speed calculated by said scan speed calculation means; and speech output means for reproducing/outputting speech information, restored by said processing means, in accordance with the reproduction speed determined by said reproduction speed determination means.

3. An apparatus according to claim 2, wherein said scan speed calculation means determines, as a parameter, a maximum number of times the same block address is read within an interval in which a predetermined number of blocks are read.

4. An apparatus according to claim 2, wherein said scan speed calculation means determines, as a parameter, an average number of times the same block address is read within an interval in which a predetermined number of blocks are read.

5. An information reproduction apparatus comprising:

read means for optically scanning and reading a code, as a two-dimensional image, from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

first count means for counting the number of images from which block addresses have been detected by said read means;

second count means for counting the number of different detected block addresses;

scan speech calculation means for calculating a scan speed from the number of images and the number of different detected block addresses which are counted by said first and second count means;

reproduction speed determination means for determining a speech reproduction speed from the scan speed calculated by said scan speed calculation means; and speech output means for reproducing/outputting speech information, restored by said processing means, in accordance with the reproduction speed determined by said reproduction speed determination means.

6. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

block address storage means for storing a plurality of block addresses detected by said read means at predetermined time intervals;

scan direction detection means for detecting a scan direction on the basis of the plurality of block addresses;

reproduction direction determination means for determining a speech reproduction direction from the scan direction calculated by said scan direction calculation means; and speech output means for reproducing/outputting speech information, restored by said processing means, in accordance with the reproduction direction determined by said reproduction direction determination means.

7. An apparatus according to claim 6, wherein the plurality of block addresses detected at the predetermined time intervals comprises two block addresses detected at an interval corresponding to a predetermined number of blocks.

8. An apparatus according to claim 6, wherein said plurality of block addresses comprises block addresses respectively detected first and last in a scan interval in which block addresses are continuously detected from an image pickup by said read means.

9. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

block address storage means for storing a plurality of block addresses detected by said read means at predetermined time intervals;

scan direction detection means for detecting a scan direction on the basis of the plurality of block addresses;

scan count means for counting the number of times scan direction detection is performed by said scan direction detection means, and setting the counted number of times as the number of times the same code is scanned;

reproduction volume determination means for determining a speech reproduction volume on the basis of the scan direction detected by said scan direction detection means and the number of times the same code is scanned, which is detected by said scan count means; and speech output means for reproducing/outputting speech information, restored by said processing means, in accordance with the reproduction volume determined by said reproduction volume determination means.

10. An apparatus according to claim 9, wherein said plurality of block addresses comprises block addresses respectively detected first and last in a scan interval in which block addresses are continuously detected from an image pickup by said read means.

11. An apparatus according to claim 9, wherein when the number of times the same code is scanned is N, said reproduction volume determination means multiplies a volume by N if a scan direction is a forward direction, and multiplies the volume by 1/N if the scan direction is a reverse direction.

12. An apparatus according to claim 9, wherein said reproduction volume determination means uses a previous speech reproduction volume of the same code as an offset amount, and a scan direction as ±1, and adds a volume change multiplied by a predetermined volume to the offset amount, thereby performing determination.

13. An apparatus according to claim 12, wherein the predetermined volume is recorded as data in a code.

14. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

first count means for counting the number of images from which block addresses have been detected by said read means;

second count means for counting the number of different detected block addresses;

count output control means for performing control to output count values from said first and second count means when no block address can be detected by said read means;

block address storage means for storing a plurality of block addresses detected by said read means at predetermined time intervals;

scan speed calculation means for calculating a scan speed on the basis of the number of images and the number of different detected block addresses which are respectively counted by said first and second count means whose outputs are controlled by said count output control means;

third count means for counting the number of output count values controlled by said count output control means;

scan count calculation means for calculating the number of times scan is performed on the basis of a count value obtained by said third count means;

scan direction detection means for detecting a scan direction from the plurality of block addresses;

reproduction speed determination means for determining a speech reproduction speed from the scan speed calculated by said scan speed calculation means;

reproduction direction determination means for determining a speech reproduction direction from the scan direction calculated by said scan direction calculation means;

reproduction volume determination means for determining a speech reproduction volume on the basis of the number of times scan is performed, which is calculated by said scan count calculation means, and the scan direction calculated by said scan direction calculation means;

speech restoration means for restoring speech information from the reproduction volume determined by said reproduction volume determination means; and speech output means for reproducing/outputting the speech information in accordance with the reproduction speed determined by said reproduction speed determination means and the reproduction direction determined by said reproduction direction determination means.

15. An apparatus according to claim 14, further comprising:

reproduction parameter fixing means for fixing output parameters from said reproduction speed determination means, said reproduction volume determination means, and said reproduction direction determination means to predetermined values; and a selection means (switch) for selecting an output parameter which is fixed to a predetermined value by said reproduction parameter fixing means.

16. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

count means for counting and storing the number of times the same block address is read by said read means;

scan speed calculation means for calculating a scan speed of said read means on the basis of the number of times the same block address is read, which is counted/memorized by said count means;

reproduction speed determination means for determining a motion image reproduction speed from the scan speed calculated by said scan speed calculation means; and motion image output means for reproducing/outputting motion image information, restored by said processing means, in accordance with the reproduction speed determined by said reproduction speed determination means.

17. An apparatus according to claim 16, wherein said scan speed calculation means determines, as a parameter, a maximum number of times the same block address is read in an interval in which a predetermined number of blocks are read.

18. An apparatus according to claim 16, wherein said scan speed calculation means determines, as a parameter, an average number of times the same block address is read in an interval in which a predetermined number of blocks are read.

19. An information reproduction apparatus comprising:

read means for optically scanning and reading a code, as a two-dimensional image, from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

first count means for counting the number of images from which block addresses have been detected by said read means;

second count means for counting the number of different detected block addresses;

scan speech calculation means for calculating a scan speed from the number of images and the number of different detected block addresses which are counted by said first and second count means;

reproduction speed determination means for determining a motion image reproduction speed from the scan speed calculated by said scan speed calculation means; and motion image output means for reproducing/outputting motion image information, restored by said processing means, in accordance with the reproduction speed determined by said reproduction speed determination means.

20. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data dot in correspondence with an address of the block, and said output means includes:

block address storage means for storing a plurality of block addresses detected by said read means at predetermined time intervals;

scan direction detection means for detecting a scan direction on the basis of the plurality of block addresses;

reproduction direction determination means for determining a motion image reproduction direction from the scan direction detected by said scan direction detection means; and motion image output means for reproducing/outputting motion image information, restored by said processing means, in accordance with the reproduction direction determined by said reproduction direction determination means.

21. An apparatus according to claim 20, wherein the plurality of block addresses detected at the predetermined time intervals comprises two block addresses detected at an interval corresponding to a predetermined number of blocks.

22. An apparatus according to claim 20, wherein said plurality of block addresses comprises block addresses respectively detected first and last in a scan interval in which block addresses are continuously detected from an image pickup by said read means.

23. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

block address storage means for storing a plurality of block addresses detected by said read means at predetermined time intervals;

scan direction detection means for detecting a scan direction on the basis of the plurality of block addresses;

scan count means for counting the number of times scan direction calculation is performed by said scan direction calculation means, and setting the counted number of times as the number of times the same code is scanned;

reproduction magnification determination means for determining an image reproduction magnification on the basis of the scan direction detected by said scan direction detection means and the number of times the same code is scanned, which is detected by said scan count means; and image output means for reproducing/outputting motion image information, restored by said processing means, in accordance with the reproduction magnification determined by said reproduction magnification determination means.

24. An apparatus according to claim 23, wherein said plurality of block addresses comprises block addresses respectively detected first and last in a scan interval in which block addresses are continuously detected from an image pickup by said read means.

25. An apparatus according to claim 24, wherein when the number of times the same code is scanned is N, said reproduction magnification determination means multiplies a magnification by N if a scan direction is a forward direction, and multiplies the magnification by 1/N if the scan direction is a reverse direction.

26. An apparatus according to claim 23, wherein said reproduction magnification determination means uses a previous motion image reproduction magnification of the same code as an offset amount, and a scan direction as ±1, and adds a magnification change multiplied by a predetermined magnification to the offset amount, thereby performing determination.

27. An apparatus according to claim 23, wherein the predetermined magnification is recorded as data in a code.

28. An information reproduction apparatus comprising:

read means for optically scanning and reading a code from a recording medium, the code being multimedia information including at least one of speech information, image information, and text data and recorded as an optically readable code;

processing means for processing the code read by said read means and restoring the code into the multimedia information; and output means for reproducing and outputting each piece of information on the basis of an output signal from said processing means, wherein the code has a plurality of blocks arranged in at least a scan direction, each code having a data code arranged in correspondence with the multimedia information, and an address code arranged at a predetermined position with respect to the data code in correspondence with an address of the block, and said output means includes:

first count means for counting the number of images from which block addresses have been detected by said read means;

second count means for counting the number of different detected block addresses;

count output control means for performing control to output count values from said first and second count means when no block address can be detected by said read means;

block address storage means for storing a plurality of block addresses detected by said read means at predetermined time intervals;

scan speed calculation means for calculating a scan speed on the basis of the number of images and the number of block addresses which are respectively counted by said first and second count means whose outputs are controlled by said count output control means;

third count means for counting the number of output count values controlled by said count output control means;

scan count calculation means for calculating the number of times scan is performed on the basis of a count value obtained by said third count means;

scan direction detection means for detecting a scan direction from the plurality of block addresses;

reproduction speed determination means for determining a motion image reproduction speed from the scan speed calculated by said scan speed calculation means;

reproduction direction determination means for determining a motion image reproduction direction from the scan direction detected by said scan direction detection means;

reproduction magnification determination means for determining a motion image reproduction magnification on the basis of the number of times scan is performed, which is calculated by said scan count calculation means, and the scan direction calculated by said scan direction calculation means;

motion image restoration means for restoring motion image information from the reproduction magnification determined by said reproduction magnification determination means; and motion image output means for reproducing/outputting the motion image information in accordance with the reproduction speed determined by said reproduction speed determination means and the reproduction direction determined by said reproduction direction determination means.

29. An apparatus according to claim 28, further comprising:

reproduction parameter fixing means for fixing output parameters from said reproduction speed determination means, said reproduction magnification determination means, and said reproduction direction determination means to predetermined values; and a selection switch for selecting an output parameter which is fixed to a predetermined value by said reproduction parameter fixing means.

* * * * *